United States Patent [19]

Harms et al.

[11] 4,400,504
[45] Aug. 23, 1983

[54] DIOXAZINE REACTIVE DYESTUFFS

[75] Inventors: Wolfgang Harms; Klaus Wunderlich, both of Leverkusen, Fed. Rep. of Germany

[73] Assignee: Bayer Aktiengesellschaft, Leverkusen, Fed. Rep. of Germany

[21] Appl. No.: 320,044

[22] Filed: Nov. 10, 1981

[30] Foreign Application Priority Data

Dec. 2, 1980 [DE] Fed. Rep. of Germany ....... 3045471

[51] Int. Cl.³ .................. C07D 498/04; C07D 521/00
[52] U.S. Cl. ........................ 544/76; 544/74; 544/75; 8/685; 8/189; 8/190
[58] Field of Search ............... 544/74, 75, 76

[56] References Cited

FOREIGN PATENT DOCUMENTS

| | | | |
|---|---|---|---|
| 1368158 | 9/1974 | United Kingdom | 544/76 |
| 1450746 | 9/1976 | United Kingdom | 544/76 |
| 1477071 | 6/1977 | United Kingdom | 544/76 |
| 1559752 | 5/1978 | United Kingdom | 544/76 |

*Primary Examiner*—Robert T. Bond
*Attorney, Agent, or Firm*—Sprung, Horn, Kramer & Woods

[57] ABSTRACT

The invention relates to new dioxazine reactive dyestuffs of the formula

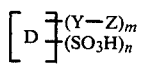 (I)

a process for their preparation and their use in dyeing and printing fibre materials which contain hydroxyl groups or amide groups.

In formula (I):

D denotes a radical of the dioxazine system of the formula

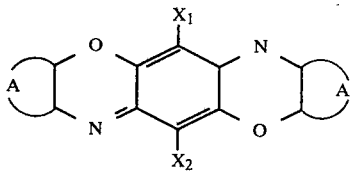 (II)

the radicals Y, Z, A, $X_1$ and $X_2$ as well as m and n having the meaning indicated in the text of the application.

The invention further relates to a process for the preparation of these new dioxazine reactive dyestuffs as well as their use in dyeing and printing fibre materials which contain hydroxyl groups or amide groups.

6 Claims, No Drawings

DIOXAZINE REACTIVE DYESTUFFS

The invention relates to new dioxazine reactive dyestuffs of the formula

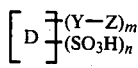  (I)

a process for their preparation and their use in dyeing and printing fibre materials which contain hydroxyl groups or amide groups.

In formula (I):

D denotes a radical of a dioxazine system of the formula

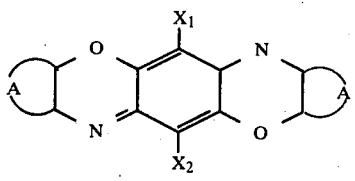  (II)

wherein

A, $X_1$ and $X_2$ have the meaning indicated in the following text,

Y denotes a bridge member,

Z denotes a reactive radical, m denotes 1–2, and n denotes 0–4.

The term D=dioxazine system is understood as meaning the compounds of the formula

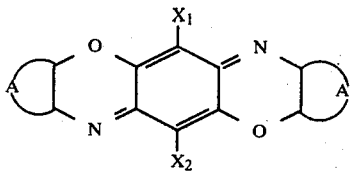  (II)

in which

A denotes 1 to 4 fused-on aromatic and/or heterocyclic rings, $X_1$ and $X_2$ independently of one another denote H, optionally substituted $C_1$–$C_4$-alkyl, cycloalkyl, optionally substituted aryl, CN, halogen, $COOR_1$, $R_1$ being H, alkyl or cycloalkyl, $CONR_2R_3$, $R_2$, and $R_3$ independently of one another being H, optionally substituted $C_1$–$C_4$-alkyl, cycloalkyl or optionally substituted aryl.

Possible substituents of this type for $C_1$–$C_4$-alkyl and aryl are preferably: OH, $SO_3H$, COOH and halogen.

Examples of such dioxazine systems are:

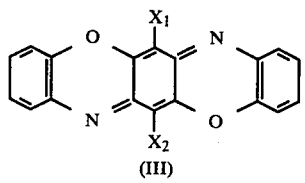

(III)

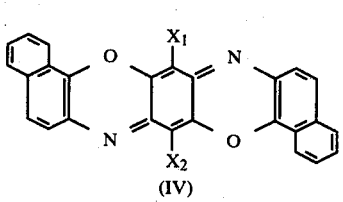

(IV)

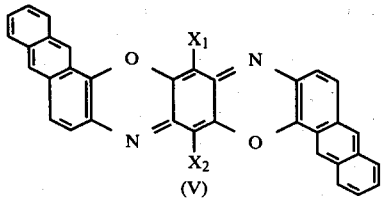

(V)

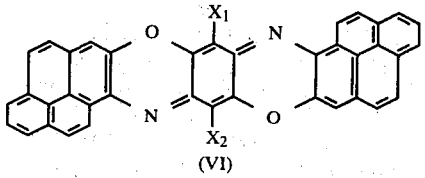

(VI)

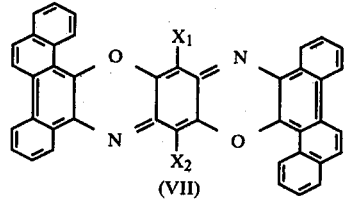

(VII)

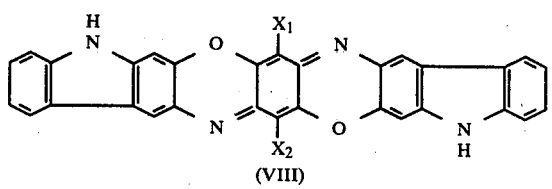

(VIII)

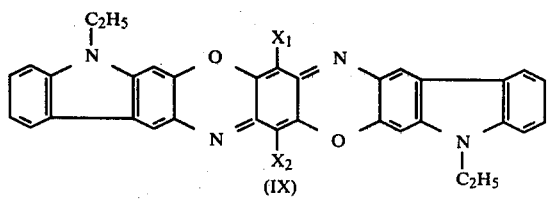

(IX)

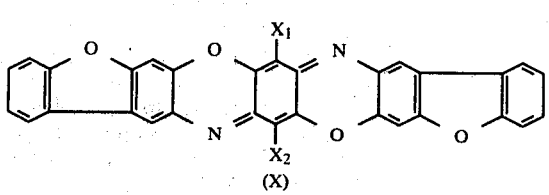

(X)

-continued

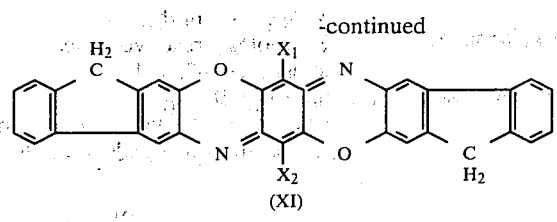

(XI)

In addition to being substituted by —Y—Z and SO₃H, these ring systems can be further substituted, for example by $C_1$–$C_4$-alkyl, aryl (in particular phenyl and naphthyl), $C_1$–$C_4$-alkoxy, aryloxy, halogen, nitro, acylamino, cyano, $NH_2$, optionally substituted $C_1$–$C_4$-alkylamino, optionally substituted arylamino, $SO_2NH_2$, $SO_2$—NH—alkyl or $SO_2N(alkyl)_2$. Possible substituents for $C_1$–$C_4$-alkylamino and arylamino are preferably: OH, $SO_3H$, COOH and halogen. The alkyl radicals in $SO_2$—NH—alkyl and $SO_2N(alkyl)_2$ preferably have 1 to 4 carbon atoms.

The bridge members Y are preferably those of the formulae:

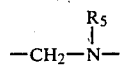 (XII)

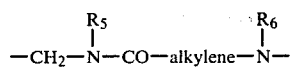 (XIII)

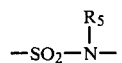 (XIV)

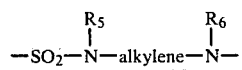 (XV)

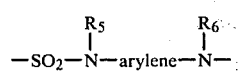 (XVI)

wherein $R_5$ denotes H or $C_1$–$C_4$-alkyl which may be substituted by OH, $SO_3H$ or $OSO_3H$, $R_6$ denotes H or $C_1$–$C_4$-alkyl which may be substituted by OH, $SO_3H$ or $OSO_3H$, alkylene denotes alkylene radicals or cycloalkylene radicals having 1 to 6 carbon atoms, which may be interrupted by O or S and which may be substituted by OH, $SO_3H$ or $OSO_3H$. Such alkylene radicals are, for example, methylene, ethylene, 1,2- and 1,3-propylene, 1,2-, 1,3-, 1,4- and 2,3-butylene, 2-methyl-1,3-propylene, 2,2-dimethylpropylene, 1,5-pentylene, 1,6-hexylene, 1,3-cyclohexylene, 1,4-cyclohexylene, 2-hydroxy-1,3-propylene, —CH₂—CH₂—O—CH₂—CH₂— and —CH₂—CH₂—S—CH₂—CH₂, arylene denotes 1,2-, 1,3- or 1,4-phenylene radicals which may be substituted by $C_1$–$C_4$-alkyl, halogen, $SO_3H$, COOH or $C_1$–$C_4$-alkoxy, such as, for example, 1,2-, 1,3-, 1,4-phenylene, 3-methyl-1,2-phenylene, 4-methyl-1,2-phenylene, 2-methyl-1,3-phenylene, 4-methyl-1,3-phenylene, 2-methyl-1,4-phenylene, 4-chloro-1,3-phenylene, 2-chloro-1,4-phenylene, 4-sulpho-1,3-phenylene, 4-sulpho-1,2-phenylene, 2-sulpho-1,4-phenylene, 2,5-disulpho-1,4-phenylene, 2-carboxy-1,4-phenylene, 4-carboxy-1,3-phenylene, 4-methoxy-1,3-phenylene or 2-methoxy-1,4-phenylene.

Reactive radicals Z are understood to be those aliphatic, aromatic or heterocyclic radicals which, after the splitting-off of a reactive substituent, as a rule in the presence of alkali, can form a covalent bond with fibre materials which contain hydroxyl groups or amide groups, preferably with cellulose fibre material.

The acyl radicals of the following acids are examples of aliphatic groups which can react with cellulose: chloroacetic acid, acrylic acid, propiolic acid, α-chloroacrylic acid, α-bromoacrylic acid, β-chloropropionic acid, β-bromopropionic acid, α,β-dichloropropionic acid, α,β-dibromopropionic acid, maleic acid, monochloromaleic acid, dichloromaleic acid, β-phenylsulphonylpropionic acid, β-methylsulphonylpropionic acid, β-phenylsulphonyl-β-chloropropionic acid, tetrafluorocyclobutanecarboxylic acid, trifluorocyclobutanecarboxylic acid, β-(tetrafluorocyclobutyl)-acrylic acid or β-(trifluorocyclobutyl)-acrylic acid.

Examples of aromatic reactive radicals are 4-fluoro-3-nitro-benzoyl, 4-fluoro-3-nitrophenylsulphonyl, 4-fluoro-3-methylsulphonylbenzoyl or 4-fluoro-3-cyanobenzoyl.

Examples of reactive heterocyclic radicals are: 2,3-dichloroquinoxalin-6- or -7-carbonyl, 2,3-dichloroquinoxalin-6- or -7-sulphonyl, 1,4-dichlorophthalazin-6-carbonyl, 1,4-dichlorophthalazin-6-sulphonyl, 2,4-dichloroquinazolin-6- or -7-sulphonyl, 2,4-dichloroquinazolin-6-carbonyl, 2,4,6-trichloroquinazolin-7- or -8-sulphonyl, 4,5-dichloro-6-pyridazon-1-yl, 4-(4′,5′-dichloro-6-pyridazon-1-yl)-benzoyl, 4-(4′,5′-dichloro-6-pyridazon-1-yl)-phenylsulphonyl, 2,4,5-trichloropyrimidin-6-yl, 2,4-dichloro-5-cyanopyrimidin-6-yl, 2,4-dichloro-pyrimidinyl-5-carbonyl, 2-methylsulphonyl-5-chloro-6-methylpyrimidin-4-yl, 2-fluoro-5-chloro-6-methylpyrimidin-4-yl, 2,4-difluoro-5-chloropyrimidin-6-yl, 2,4-difluoro-pyrimidin-6-yl, 2,4-difluoro-pyrimidin-6-yl, 2-fluoro-4,5-dichloro-pyrimidin-6-yl, 3,5,6-trifluoropyridazin-4-yl, 3,4,5-trifluoropyridazin-6-yl, 3,6-dichloropyridazin-5-carbonyl, 2,4-dichloro-s-triazinyl, 2,4-dibromo-s-triazinyl, 2-chloro-4-amino-s-triazinyl, 2-fluoro-4-amino-s-triazinyl, 2-chloro-4-methoxy-s-triazinyl, 2-fluoro-4-methoxy-s-triazinyl, 2-chloro-4-β-methoxy-ethoxy-s-triazinyl, 2-fluoro-4-β-methoxy-ethoxy-s-triazinyl, 2-chloro-4-phenyl-s-triazinyl, 2-chloro-4-phenylamino-s-triazinyl, 2-fluoro-4-phenylamino-s-triazinyl, 2-chloro-4-methyl- and -4-dimethylamino-s-triazinyl, 2-fluoro-4-methyl- and -4-dimethylamino-s-triazinyl, 2-fluoro-4-diethylamino-s-triazinyl, 2-chloro-4-β-hydroxyethylamino-s-triazinyl, 2-chloro-4-β-sulphatoethylamino-s-triazinyl, 2-chloro-4-β-sulphoethylamino-s-triazinyl, 2-chloro-4-phenoxy-s-triazinyl, 2-chloro-4-(2′-, 3′- or 4′-sulphophenylamino)-s-triazinyl, 2-fluoro-4-(2′-, 3′- or 4′-sulphophenylamino)-s-triazinyl, 2-chloro-(2′, 4′-, 2′,5′-, 3′,5′- or 3′,4′-disulphophenylamino)-s-triazinyl, 2-fluoro-4-(2′,4′-, 2′,5′-, 3′,5′- or 3′,4′-disulphophenylamino)-s-triazinyl, 2-chloro-4-(2′-, 3′- or 4′-carboxyphenylamino)-s-triazinyl, 2-fluoro-4-(2′-, 3′- or 4′-carboxyphenylamino)-s-triazinyl, 2-fluoro-4-(2′,4′- dicarboxyphenylamino)-s-triazinyl, 2-chloro-4-(2'-carboxy-4'- or -5'-sulphophenylamino)-s-triazinyl, 2-fluoro-4-(2'-carboxy-4'- or -5'-sulphophenylamino)-s-triazinyl, 2-fluoro-4-(2'-methyl-4',5'-disulphophenylamino)-s-triazinyl, 2-chloro-4-(1',5'-, 2',6'-, 4',8'-, 5',7'- or 6',8'-disulpho-2'-naphthylamino)-s-triazinyl, 2-fluoro-4-(1',5'-, 2',6'-, 4',8'-, 5',7'- or 6',8'-disulpho-2'-naphthylamino)-s-triazinyl, 2-chloro-4-(2',4'-, 3',7'-, 3',8'-, 4',8'-, 5',7'- or 6',8'-disulpho-1'-naphthylamino)-s-triazinyl, 2-fluoro-4-(2',4'-, 3',7'-, 3',8'-, 4',8'-, 5',7'- or 6',8'-disulpho-1'-naphthylamino)-s-triazinyl, 2-chloro-4-(1',5',7'- or 3',6',8'-trisulpho-2'-naphthylamino)-s-triazinyl, 2-fluoro-4-(1',5',7'- or 3',6',8'-trisulpho-2'-naphthylamino)-s-triazinyl or 2-chloro-4-(3',5',7'- or 3',6',8'-trisulpho-1'-naphthylamino)-s-triazinyl.

The range of the halogeno-s-triazinyl radicals is not restricted to those listed above. The alkyl groups or aryl groups in the 2-halogeno-4-alkylamino- or -4-arylamino-s-triazinyl radicals and in the 2-halogeno-4-alkoxy- or -4-aroxy-s-triazinyl radicals can be further substituted. Furthermore, the reactive halogen atoms in the abovementioned 2-halogeno-4-substituted-triazinyl radicals can be replaced by tertiary bases, such as trimethylamine, triethylamine, dimethyl-β-hydroxyethylamine, triethanolamine, N,N-dimethylhydrazine, pyridine, α,γ-picoline, nicotinic acid or isonicotinic acid, quaternary salts being formed.

Preferred compounds of the formula I–II are those with $X_1$, $X_2$ = chlorine.

Amongst these, those are preferred which correspond to the formulae:

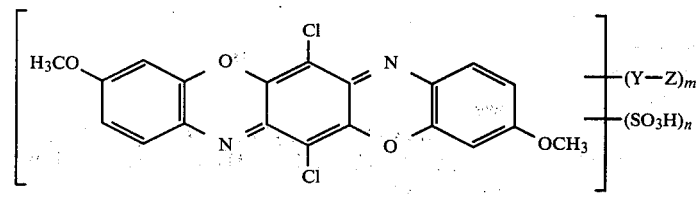

(XVII)

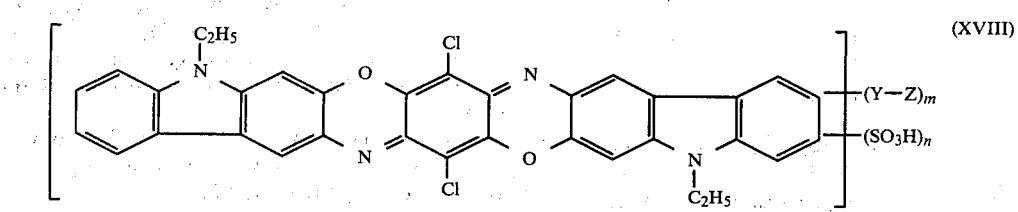

(XVIII)

wherein
the bridge members Y denote $CH_2-NH-$,

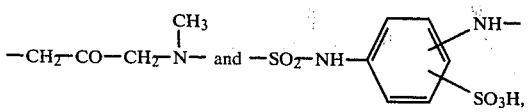

m denotes 1–2 and
n denotes 0–2.

Dioxazine systems such as III–XI can be obtained by the condensation of 2,5-dihalogeno-1,4-benzoquinones, which may be appropriately substituted, with aromatic or aromatic-heterocyclic amine components, or by the addition of aromatic amines to substituted 1,4-benzoquinones and subsequent ring closure by oxidation or condensation; this is carried out by known methods extensively described in the literature (K. Venkataraman "The Chemistry of Synthetic Dyes", volume II, page 786, volume V, page 419).

The bridge members XII–XIII are introduced into the ring systems mentioned by a condensation reaction with N-methylol-amides

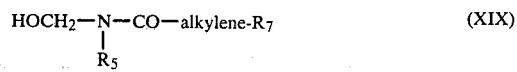

(XIX)

wherein
$R_7$ is H or a replaceable substituent, such as, for example, halogen, sulphato, alkylsulphonyl or arylsulphonyl,
carried out in 85–100% strength sulphuric acid, oleum, concentrated phosphoric acid or mixtures of phosphoric acid and $P_2O_5$, at 0°–50°.

After subsequent or prior sulphonation carried out in concentrated sulphuric acid, oleum or chlorosulphonic acid, or in solutions of sulphur trioxide in pyridine, aliphatic or aromatic chlorinated hydrocarbons or dimethylformamide, and formation of the compounds

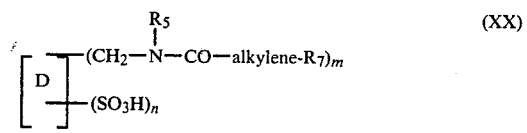

(XX)

wherein
D, $R_5$, $R_7$, alkylene, m and n have the above-mentioned meaning, either hydrolysis in dilute mineral acids to give compounds of the formula

(XXI)

wherein
D, $R_5$, m and n have the meaning indicated,
or replacement of $R_7$ by $NHR_6$, by using amines $R_6-NH_2$, to give compounds of the formula

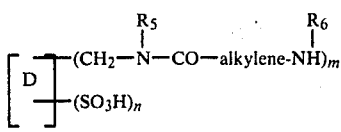 (XXII)

wherein

D, $R_5$, $R_6$, alkylene, m and n have the meaning indicated, can be carried out.

The sulphamide bridge members XIV–XVI are introduced by sulphochlorination of the abovementioned ring systems, for example using chlorosulphonic acid or chlorosulphonic acid thionyl chloride at 20°–120°, subsequent condensation reaction of the sulphonic acid chlorides with aliphatic amines or diamines or aromatic diamines of the formulae

 (XXIII)

 (XXIV)

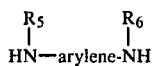 (XXV)

wherein $R_5$, $R_6$, alkylene and arylene have the meaning indicated, carried out in an aqueous, aqueous-organic or organic medium and subsequent hydrolysis in an alkaline medium of the excess sulphochloride groups which may be present. In the case of the aliphatic and aromatic diamines, a variant consists in the condensation reaction of the sulphochlorides with the monoacylamines

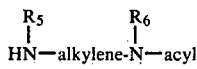 (XXVI)

 (XXVII)

wherein acyl represents, for example, formyl, acetyl or oxalyl, and the subsequent hydrolysis in dilute alkalis or mineral acids of excess sulphochloride groups which may be present and the acylamino groups.

A special variant for preparing intermediate products of the formula

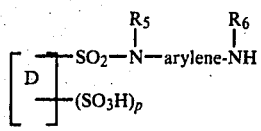 (XXVIII)

or

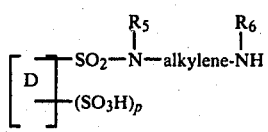 (XXIX)

wherein

D, $R_5$, $R_6$, arylene and alkylene have the above-mentioned meaning and p denotes 0–2, consists in condensing polyhalogeno-1,4-benzoquinones with compounds of the formula

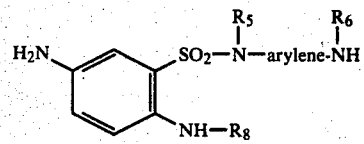 (XXX)

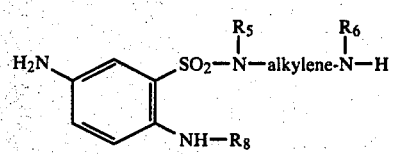 (XXXI)

wherein $R_8$ denotes $C_1$–$C_6$-alkyl or cycloalkyl, which may be substituted by OH, $OCH_3$, $OSO_3H$, $SO_3H$ or halogen, and $R_5$, $R_6$, alkylene and arylene have the above-mentioned meaning and at least one of the alkylene or arylene radicals or $R_5$, $R_6$ or $R_8$ must contain a group $SO_3H$ or $OSO_3H$ which imparts solubility in water, or in adding compounds of the formulae XXX or XXXI to optionally substituted 1,4-benzoquinones to give intermediate products of the formula

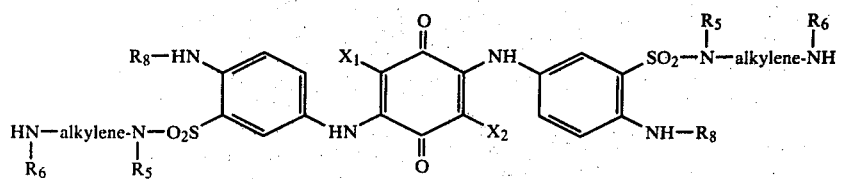 (XXXII)

or

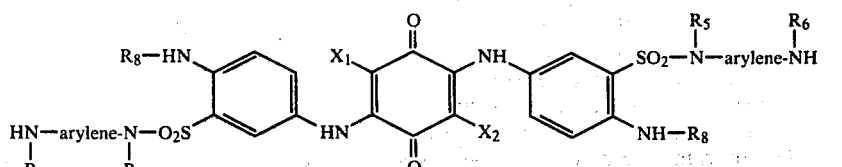 (XXXIII)

wherein $R_5$, $R_6$, $R_8$, alkylene, arylene, $X_1$ and $X_2$ have the abovementioned meaning,
and a subsequent oxidative ring closure of the intermediate products XXXII and XXXIII to give the correspondingly substituted dioxazine compounds of the formula

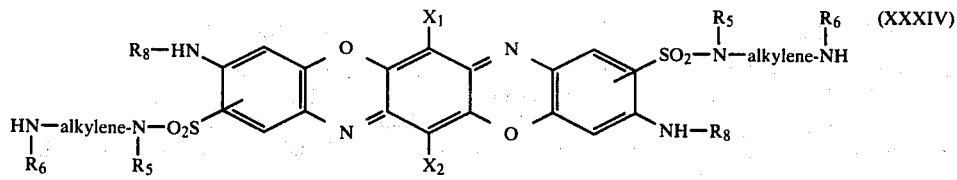

(XXXIV)

or

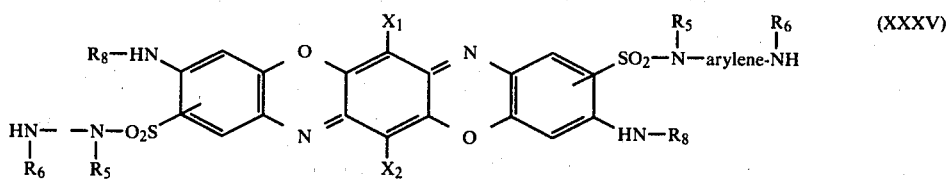

(XXXV)

The intermediate products, obtained in all cases, of the formula

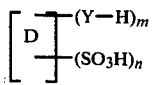

(XXXVI)

wherein
D, Y, m and n have the abovementioned meaning and
H represents hydrogen,
are condensed with the reactive components Z-halogen    (XXIX)

wherein
Z has the abovementioned meaning and halogen is F, Cl or Br.

If Z denotes dihalogenotriazinyl, one further halogen atom per triazine system can be replaced in the resulting dihalogenotriazinyl dyestuffs. The condensation reaction of the dioxazine dye bases XXXVI with the reactive components XXXVII is carried out in an aqueous or aqueous-organic medium-which is used depends on the reactive component used-at temperatures of 0°-80° and pH values of 3-10 in the presence of alkaline condensing agents, such as aqueous solutions of alkali metal carbonate, alkali metal hydroxide or alkali metal phosphate.

The new dyestuffs are extremely valuable products, which are suitable for the most diverse areas of application. Since they are water-soluble compounds, they are of preferred interest in dyeing textile materials which contain hydroxyl groups or amide groups, in particular textile materials from native or regenerated cellulose, further from wool, silk or synthetic polyamide or polyurethane fibres.

The materials mentioned are dyed or printed by the methods customary for reactive dyestuffs. Red, violet and blue dyeings and prints, fast to light and wetting, are obtained.

The temperature values in the examples are in °C. In the description and in the examples the formulae of the dyestuffs show the free acids. In general, the dyestuffs are isolated and used in the form of their alkali metal salts, in particular the sodium salt or potassium salt.

EXAMPLE 1

(A) 9.1 parts of N-methylolchloroacetamide are added to 90 ml of 93% strength sulphuric acid at 0°-5°. 20.6 g of a compound of the formula

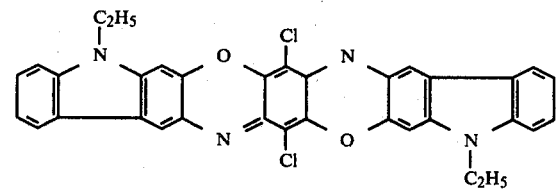

is then added and the mixture is stirred for 20 hours at 0°-5°. After the condensation reaction is complete, the batch is discharged onto 700 g of ice, the precipitated product is filtered off with suction, washed with water until sulphate-free, and dried.

(B) 21 g of the condensation product obtained are added to a mixture of 42 ml of 96% strength sulphuric acid and 72 ml of 20% strength oleum at 15°-20°. The mixture is stirred for 15 hours at 15°-20°, the resulting solution is discharged onto 900 g of ice, the product is filtered off with suction and the filter cake is washed with 500 ml of 5% strength hydrochloric acid.

(C) The moist filter cake is dissolved in 500 ml of boiling water, 16 ml of concentrated hydrochloric acid are added dropwise to this solution and the resulting mixture is boiled for 18 hours under reflux. After cooling, the precipitate is filtered off with suction, washed with 1 liter of cold water and dried. The product obtained corresponds to the formula

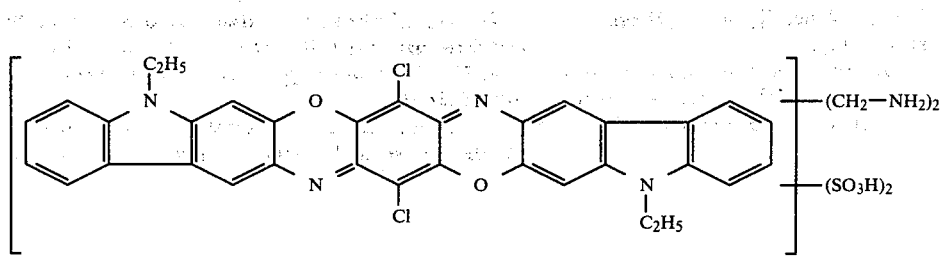

EXAMPLE 2

5.8 ml of cyanuric fluoride are added dropwise in the course of 10 minutes at 0°–5° to a solution of 11.0 g of 2-aminobenzenesulphonic acid in 70 ml of water. During this addition the pH value is maintained at 4.5 using a 2 N solution of sodium carbonate and is adjusted to 5.5 after the reaction has ended.

20.0 g of the above dye base are dissolved in 600 ml of water at 50° and pH 9.5–10. The solution is cooled to 0°–5° and the difluorotriazinylaminobenzenesulphonic acid component obtained above is added in the course of about 30 minutes. During this addition the pH value of the reaction mixture is maintained at 8.5–8.8 using a 1 N solution of sodium hydroxide and the temperature is maintained at 0°–5°. After 16 hours the solution is warmed to 20°, the pH being controlled, and 20% of sodium chloride is gradually added. The dyestuff, which corresponds to the formula

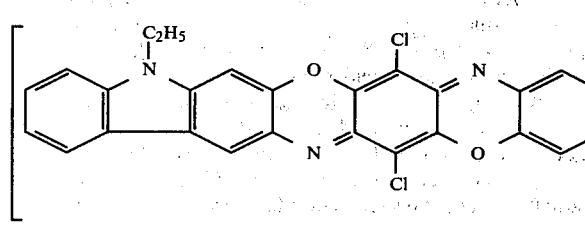

is filtered off with suction, washed with a 20% strength sodium chloride solution and is dried in vacuo at 40° after having been made into a paste with 0.5 g of a phosphate buffer mixture.

With the dyestuff obtained, cellulose materials can be dyed or printed in blue shades having food fastness properties, by the known method.

EXAMPLE 3

If the 2-aminobenzenesulphonic acid in Example 2 is replaced by 16.0 parts of 2-aminobenzene-1,4-disulphonic acid and if the procedure followed is in other respects completely analogous, a dyestuff of the formula

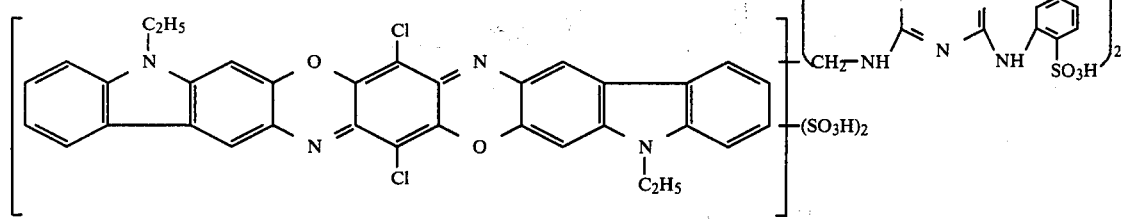

is obtained, which exhibits similar dyeing properties on cellulose materials.

EXAMPLE 4

14.0 g of 3-aminobenzenesulphonic acid are suspended in 100 ml of water. 7.5 ml of cyanuric fluoride are added dropwise to the suspension at 0°–5° and the pH value is maintained at 3.5 using a 2 N solution of sodium carbonate. After the condensation reaction is complete, the pH value is adjusted to 5.0, the solution is added dropwise at 0°–5°, in the manner described in Example 2, to a solution of 20.0 g of the dye base of Example 1C and the pH value is maintained at 8.5–9.0 using a solution of sodium hydroxide. After the condensation reaction is complete, the product is salted out with 20% of sodium chloride, filtered off with suction, washed with 25% strength sodium chloride solution and dried in vacuo after a buffer has been admixed. The dyestuff of the formula

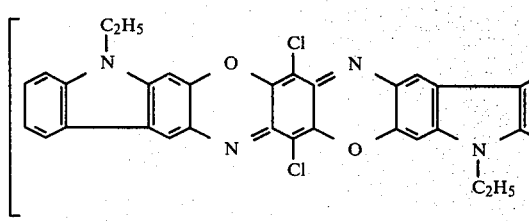

yields, on cellulose materials, blue dyeings and prints having similar properties to the dyestuff of Example 2.

EXAMPLE 5

16.0 g of 4-aminobenzene-1,3-disulphonic acid are added dropwise at 0°–5° to a suspension which was prepared by dissolving 11.7 g of cyanuric chloride in 50 ml of acetone and pouring the solution onto 80 g of ice. During the addition the pH value is maintained at 4.5–5 using 2 N sodium carbonate solution. The clarified solution obtained after complete reaction of the cyanuric chloride is added dropwise at 20° in the course of 30 minutes to a solution of 20.0 g of the dye base of Example 1C in 600 ml of water and the pH value is maintained at 8.5–9.0. When the condensation reaction has ended, after 16 hours, working-up is carried out according to the instructions of Example 2. A dyestuff of the formula

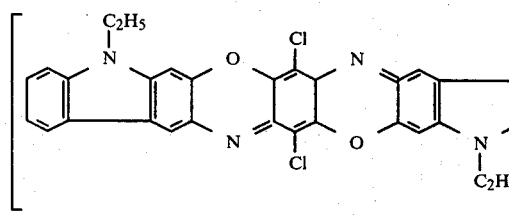

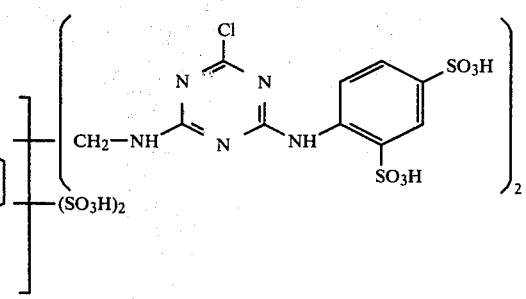

is obtained with which cellulose fibres can be printed and dyed in blue shades, by the techniques customary for reactive dyestuffs.

Similar blue dyestuffs which are suitable for dyeing and printing cellulose and polyamide materials are obtained, if the following reactive components, instead of the reactive component used in Example 2, are condensed with the colorant body:

See Table 1 below.

TABLE 1

(Reactive components 6–11 shown as chemical structures.)

TABLE 1-continued
| No. | Reactive component | No. | Reactive component |
|---|---|---|---|
| 12. | 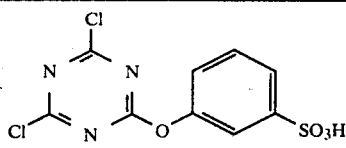 | 13. | 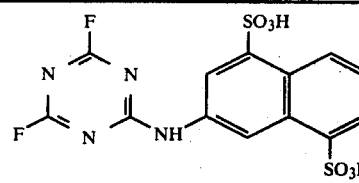 |
| 14. | 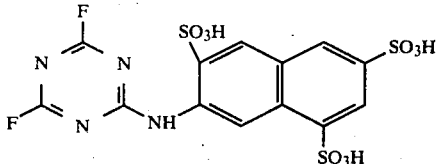 | 15. | 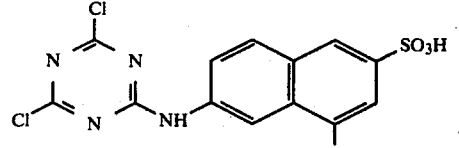 |
| 16. | 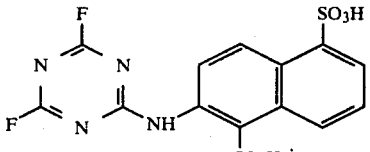 | 17. | 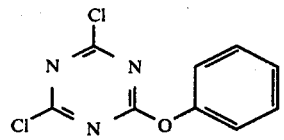 |
| 18. | 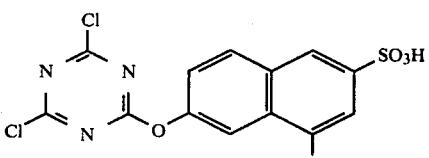 | 19. | 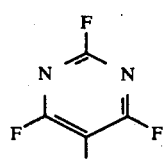 |
| 20. | 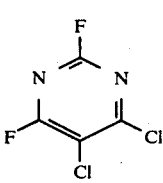 | 21. | 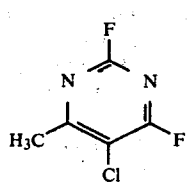 |
| 22. | 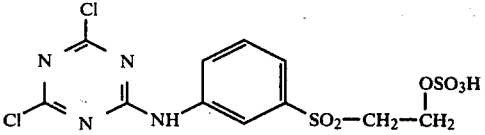 | 23. | 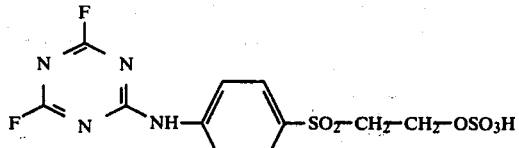 |
| 24. | 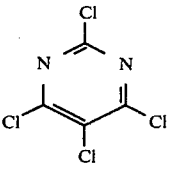 | 25. | 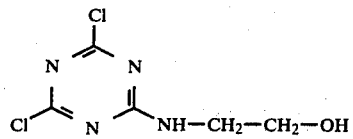 |
| 26. | 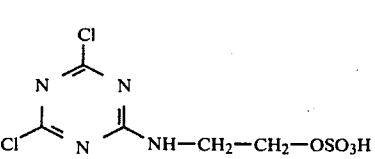 | 27. | 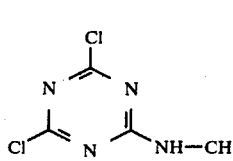 |
| 28. | 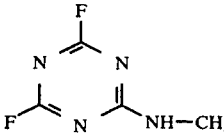 | 29. | 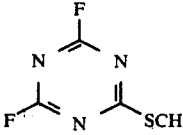 |

TABLE 1-continued

| No. | Reactive component | No. | Reactive component |
|---|---|---|---|
| 30. | (structure: dichloropyrazine with COCl-phenyl) | 31. | (structure: dichloropyrazine with SO$_2$Cl-phenyl) |
| 32. | (structure: dichlorophthalazine with COCl) | 33. | (structure: pyrimidine with SO$_2$CH$_3$, Cl, Cl, CH$_3$) |
| 34. | (structure: dichloro-quinazoline-type with —SO$_2$Cl (6 or 7)) | 35. | (structure: dichloro-quinazoline with Cl and SO$_2$Cl) (7 or 8) |
| 36. | (structure: cyanuric chloride, 2,4,6-trichloro-1,3,5-triazine) | 37. | (structure: 2,4-dichloropyrimidine type) |
| 38. | (structure: dichloropyrimidine with CN) | 39. | (structure: dichlorotriazine with NH$_2$) |
| 40. | (structure: difluorotriazine with NH$_2$) | 41. | (structure: difluorotriazine with N(C$_2$H$_5$)$_2$) |
| 42. | (structure: dichloropyridazinone with COCl-phenyl) | 43. | (structure: difluorotriazine with NH-phenyl-(SO$_3$H)$_2$) |
| 44. | (structure: dichlorotriazine-NH-phenyl with SO$_3$H and COOH) | 45. | (structure: dichlorotriazine-NH-phenyl with COOH and COOH) |
| 46. | (structure: dichlorotriazine with N(CH$_3$)$_2$) | 47. | (structure: dichlorotriazine-O-phenyl-SO$_3$H) |
| 48. | (structure: dibromopyrimidine with Br) | 49. | (structure: tribromotriazine) |

TABLE 1-continued

| No. | Reactive component | No. | Reactive component |
|---|---|---|---|
| 50. | ![structure] | 51. | ![structure] |

EXAMPLE 52

17 g of the intermediate product of Example 1B, of the formula

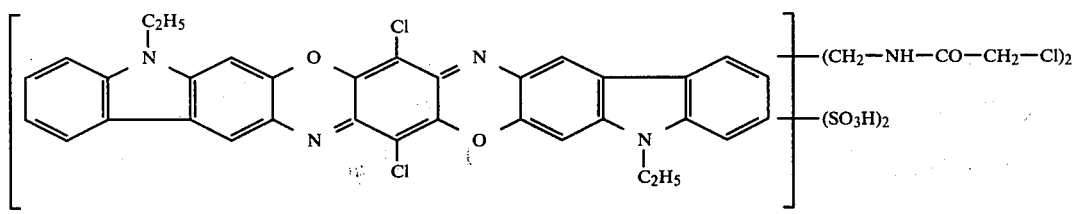

are added to 200 ml of water and 100 ml of 30% strength methylamine solution. The mixture is heated for some hours at 50° until the replacement of chlorine in the side chain is complete, and the batch is then acidified using concentrated hydrochloric acid whilst ice is being added. The precipitated product is filtered off with suction and washed with 0.1% strength hydrochloric acid until amine-free.

The product obtained is dissolved in 450 ml of water at pH 9.5.

11.6 g of 2-aminobenzene-1,4-disulphonic acid are dissolved in 60 ml of water at pH 5. After cooling to 0°–5°, 4.3 ml of cyanuric fluoride are added dropwise and the pH value is maintained at 4.5 to 5.0 using 2 N sodium carbonate solution. The resulting solution of the reactive component is added dropwise at 0°–5° to the solution of the dyestuff component as prepared above and the pH value is maintained at 8–8.5 using 2 N sodium hydroxide solution.

After the reaction is complete the solution is warmed to 20° and the dyestuff is salted out using 22% of sodium chloride. The precipitate is filtered off with suction and dried in vacuo at 40° after the addition of phosphate buffer.

The dyestuff obtained corresponds to the formula

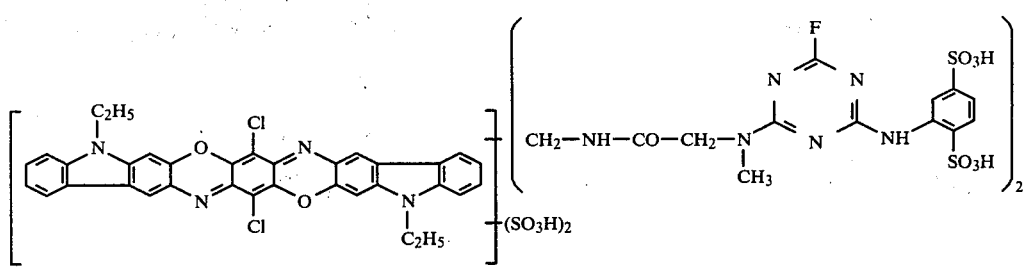

and dyes cellulose fibres in blue shades.

EXAMPLE 53

15.0 g of the dioxazine compound

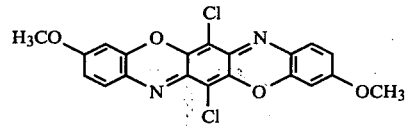

are added to 45 ml of concentrated sulphuric acid at 15°–20°. When the product is dissolved, 30 ml of 20% strength oleum are added with cooling and the mixture is stirred for 1½–2 hours until the starting product has disappeared and the monosulphonic acid has formed.

5.5 g of N-methylolchloroacetamide are now added and the mixture is stirred for 48 hours at 20°. After the reaction is complete, the batch is discharged onto ice, the product is filtered off with suction and washed with dilute hydrochloric acid. The moist cake is now heated at 45°–50° in 250 ml of water and 50 ml of 30% strength methylamine solution until the replacement of chlorine is complete.

The resulting product of the formula

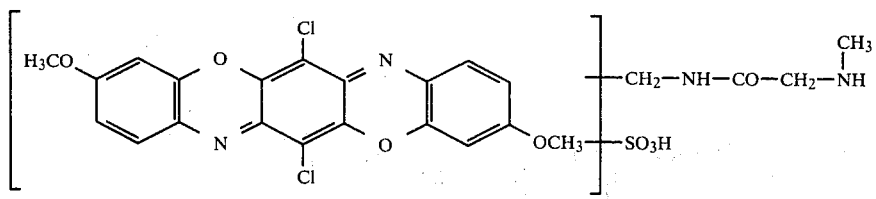

is precipitated by salting out or by acidifying, filtered off with suction and washed until amine-free.

The product obtained is dissolved in 450 ml of water at pH 9.5. A solution of 2-(4',6'-dichloro-s-triazinylamino)-benzene-1,4-disulphonic acid, prepared analogously to the instructions of Example 5 from 10.8 g of 2-aminobenzene-1,4-disulphonic acid and 7.9 g of cyanuric chloride, is added dropwise and the pH value of the reaction mixture at 20° is maintained at 7.5–8.5. After the reaction is complete, the dyestuff is salted out with 20% of sodium chloride, filtered off with suction and washed with sodium chloride solution.

The product of the formula

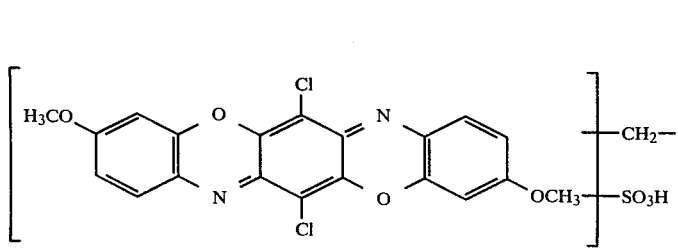

yields red prints and dyeings on cellulose fibres, which are fast to wetting.

EXAMPLE 54

If a mixture of 20.6 g of the compound

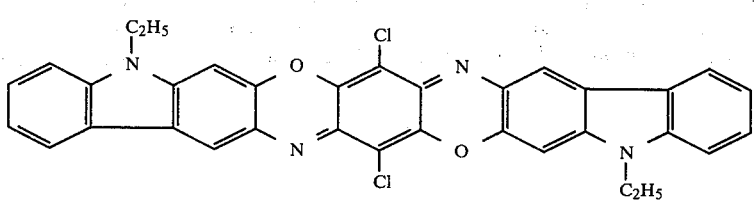

and 4.9 parts of N-methylolchloroacetamide are added to 90 ml of 93% strength sulphuric acid and if the procedure described in Example 1 is followed otherwise, a compound is obtained which approximately corresponds to the formula

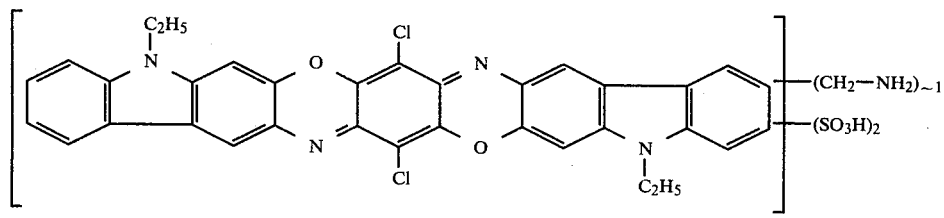

15.0 g of this intermediate product are dissolved in 300 ml of water at pH 9.5–10. 2.3 ml of 2,4,6-trifluoro-5-chloropyrimidine are added dropwise to this solution in the course of 30 minutes and the pH value is maintained at 8.0–8.5 using 2 N sodium hydroxide solution. The mixture is stirred for 15 hours and, after the condensation is complete, the dyestuff is salted out with 20% of sodium chloride. The precipitate is filtered off with suction and washed with sodium chloride solution. Using the product of the approximate formula

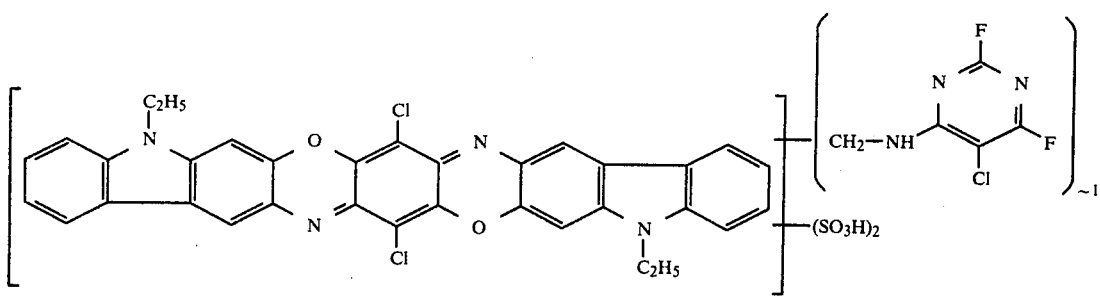

cellulose fibres can be dyed or printed in blue shades.

If, in continuation of the preceding examples, the dioxazine dye bases of column II, Table 2, prepared analogously, are condensed with 1 or 2 mols of the reactive components listed in column III, dyestuffs are obtained which are suitable for the reactive dyeing and printing of cellulose materials and yield the shades of column IV.

See Table 2 below.

TABLE 2
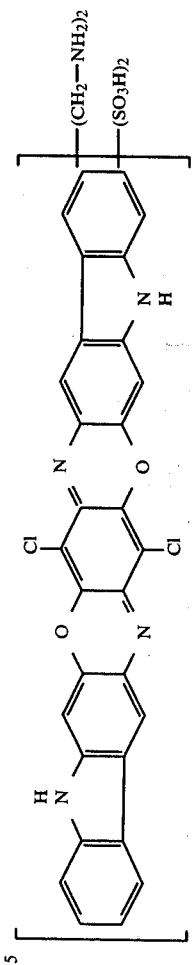

TABLE 2-continued

| I | II | III | IV |
|---|---|---|---|
| 60 | (structure with chlorinated quinone-phenoxy-biphenyl linkages, substituents (CH₂—NH₂)₁ and (SO₃H)₂) | (triazine with three Cl substituents) | " |
| 61 | (similar structure with CH₂ bridges, substituents (CH₂—NH₂)₂ and (SO₃H)₂) | (triazine with Cl, NH-aryl bearing C₃H and two SO₃H groups) | violet |
| 62 | | (triazine with two F, NH-aryl with two SO₃H) | " |
| 63 | (structure with —CH₂—NH—CO—CH₂—NH—CH₃ and SO₃H and OCH₃ substituents) | (triazine with two F, NH-aryl with two SO₃H) | red |
| 64 | | (triazine with two F, NH-aryl with one SO₃H) | " |

TABLE 2-continued

| I | II | III | IV |
|---|---|---|---|
| 65 | | (pyrimidine with F, Cl, F) | " |
| 66 | (complex structure with H3CO-phenyl-N=quinone-O-phenyl-OCH3 and CH2-NH-CO-CH2-NH / CH2OH / CH2-SO3H bracket) | (chloro-difluoropyrimidine) | red |
| 67 | (similar to 66 with CH2OSO3H instead of CH2OH) | (dichloropyrimidine-NH-phenyl-SO3H) | " |
| 68 | (chloro-quinone structure with NH-COCH3, CH2-NH-CO-CH2-NH-CH3, SO3H) | (dichloropyrimidine-NH-phenyl-(SO3H)2) | " |
| 69 | (bis-quinone biphenyl structure with N(C2H5), CH3, (CH2-NH2)2, (SO3H)2) | (fluoro-chloropyrimidine-NH-phenyl-SO3H) | blue |

TABLE 2-continued

| I | II | III | IV |
|---|---|---|---|
| 70 | (dye structure with methoxy-phenoxy quinone diimine linked via $-CH_2-N(CH_3)-CO-CH_2-NH-$ to phenyl-$SO_3H$-$OCH_3$) | (chloro-dichlorotriazinyl-amino phenyl with $SO_3H$ and $COOH$) | red |
| 71 | (bis-biphenyl-ethylamino substituted diimine quinone with $NHCOCH_3$ groups, linked via $[-CH_2-NH-CO-CH_2-NH-]_2$ with $CH_3$ and $(SO_3H)_2$) | (difluorotriazinyl-amino phenyl with $SO_3H$, $SO_3H$) | blue |
| 72 | (methoxy-phenoxy dimethyl quinone diimine linked via $-CH_2-N(CH_3)-CO-CH_2-NH-$ to phenyl-$SO_3H$-$OCH_3$) | (chloro-dichlorotriazinyl-amino phenyl with $SO_3H$, $SO_3H$) | red |
| 73 | (methoxy-phenoxy dicyano quinone diimine linked via $-CH_2-N(CH_3)-CO-CH_2-NH-$ to phenyl-$SO_3H$-$OCH_3$) | (fluoro-difluorotriazinyl-amino phenyl with $SO_3H$, $SO_3H$) | " |

EXAMPLE 74

16.0 g of the dioxazine compound of the formula

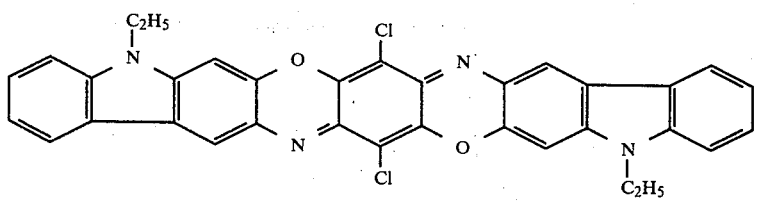

are added to 40 ml of chlorosulphonic acid at 20°–30°. The mixture is stirred for 1 hour. When all the starting product has disappeared, 10 ml of thionyl chloride are added, the mixture is heated to 30° and kept at this temperature for 45 minutes. The batch is then allowed to run into a mixture of 500 g of ice and 100 ml of concentrated hydrochloric acid, the precipitated bis-sulphochloride is filtered off with suction and the cake is washed with 2 liters of ice-water until neutral. The filter cake is added to a neutral solution of 12.2 g of 2,5-diaminobenzenesulphonic acid in 500 ml of water and 80 ml of ethanol. The pH of the reaction mixture is maintained at 7.0–8.0 using 2 N sodium carbonate solution and the mixture is stirred for 16 hours. The resulting sulphamide condensation product of the formula

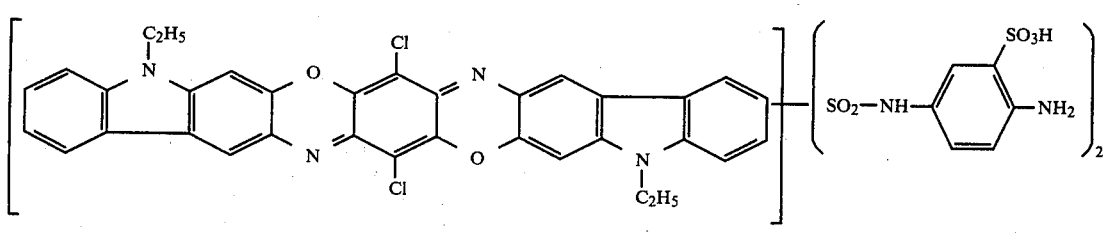

is salted out with sodium chloride, filtered off with suction, washed with dilute sodium chloride solution and dried at 70° in a circulating-air cabinet.

EXAMPLE 75

14.0 g of intermediate product of Example 74 are dissolved in 200 ml of water and 100 ml of N-methylpyrrolidone. After cooling the solution to 0°–5°, 2.8 ml of cyanuric fluoride are added dropwise in the course of 5–10 minutes and the pH value is maintained at 4.5–5.0 using 2 N sodium carbonate solution. After the condensation reaction is complete, a neutralised solution of 6.9 g of 3-aminobenzenesulphonic acid in 70 ml of water is added and the pH value is then maintained at 6.0–6.2 using 2 N sodium carbonate solution. When the condensation reaction is complete, after stirring for several hours, the batch is warmed to 20°. The dyestuff is salted out with 185 g of sodium chloride, the precipitate is filtered off with suction and the cake is washed with 650 ml of 15% strength sodium chloride solution. The product is made into a paste, with a phosphate buffer, and dried in vacuo at 40°.

It corresponds to the formula

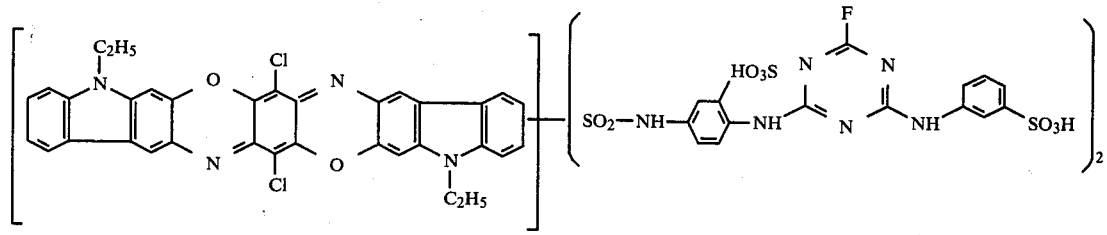

and dyes cellulose fibres in markedly redder blue shades than the dyestuffs of the Examples 2–4.

EXAMPLE 76

16.0 g of the dioxazine compound of the formula

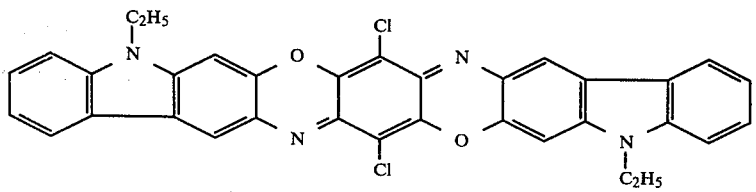

are sulphochlorinated as described in Example 74. The resulting sulphochloride filter cake is added to a solution of 5.9 g of 2,5-diaminobenzenesulphonic acid in 500 ml of water and 80 ml of ethanol. The mixture is stirred for 15 hours at pH 7.8–8.0 and 20° and is finally heated for 2 hours at 80° at pH 9–10. The intermediate product obtained is salted out with 15% of sodium chloride, washed with sodium chloride solution and dried.

15.0 g of the intermediate product obtained are dissolved in 300 ml of water. A solution of 3.6 g of cyanuric chloride in 50 ml of acetone is added dropwise at 10° and the pH value of the reaction mixture is maintained at 5.5. After the condensation reaction is complete, a solution of 3.4 g of 3-aminobenzenesulphonic acid is added and the reaction mixture is warmed to 35°-40°, the pH value being maintained at 6.0-6.5. When the reaction is complete, after several hours, the dyestuff is salted out with sodium chloride, washed and dried. It corresponds to the approximate formula

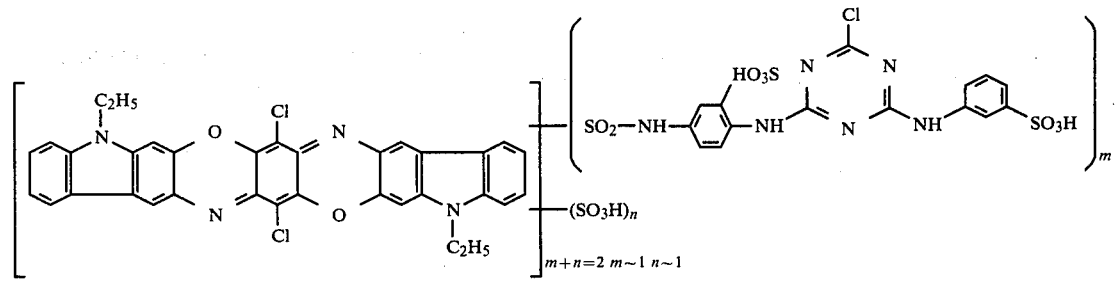

and yields blue prints and dyeings on cellulose fibres.

EXAMPLE 77

If the intermediate product prepared in Example 76 is reacted with cyanuric fluoride instead of cyanuric chloride and if a condensation reaction is then carried out with 3-aminobenzenesulphuric acid as described in Example 75, a similar dyestuff of the approximate formula

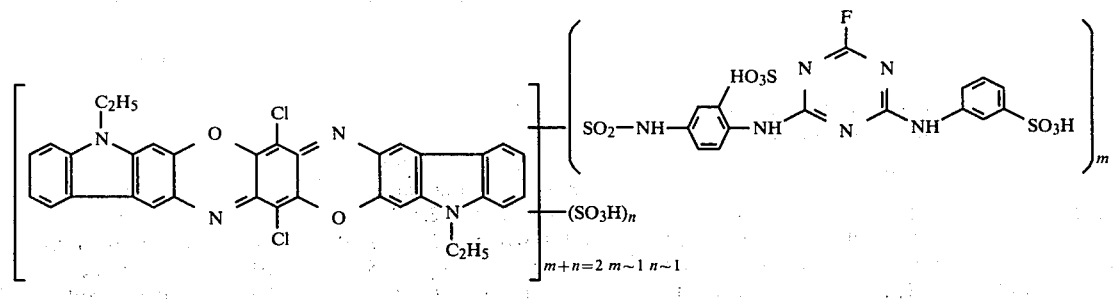

is obtained, which dyes cellulose fibres in slightly greener-blue shades than the dyestuff of Example 75.

EXAMPLE 78

16.0 g of the dioxazine compound of the formula

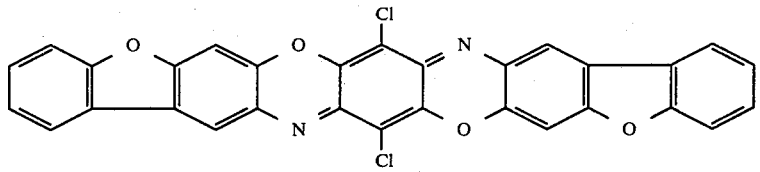

are converted into a bis-sulphochloride analogously to the instructions of Example 74, using chlorosulphonic acid-thionyl chloride, and this bis-sulphochloride is condensed with 2,5-diaminobenzenesulphonic acid in an aqueous medium.

10.5 g of the worked-up and dried product of the formula

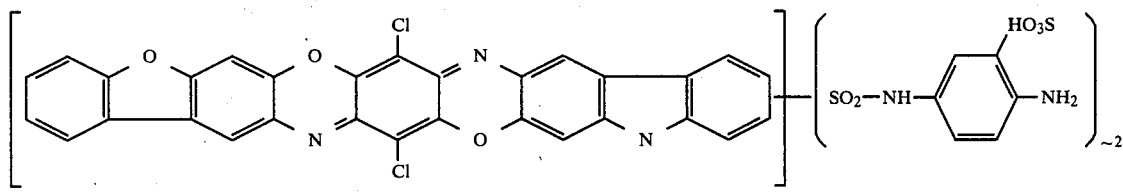

are dissolved in 200 ml of water and 50 ml of N-methyl-pyrrolidone. After cooling to 0°-5°, 2.2 ml of cyanuric fluoride are added dropwise and the pH value is maintained at 4.5-5.0 using 1 N sodium carbonate solution. After the condensation reaction is complete, a neutralised solution of 5.5 g of 3-aminobenzenesulphonic acid in 50 ml of water are added and the pH value is maintained at 5.8-6.3 at 0°-5°. When the condensation reaction is complete, after several hours, the dyestuff solution is warmed to 20° and gradually saturated with sodium chloride. The precipitated dyestuff is filtered off with suction, washed with saturated sodium chloride solution and dried in vacuo at 40°.

Using the resulting dyestuff of the composition

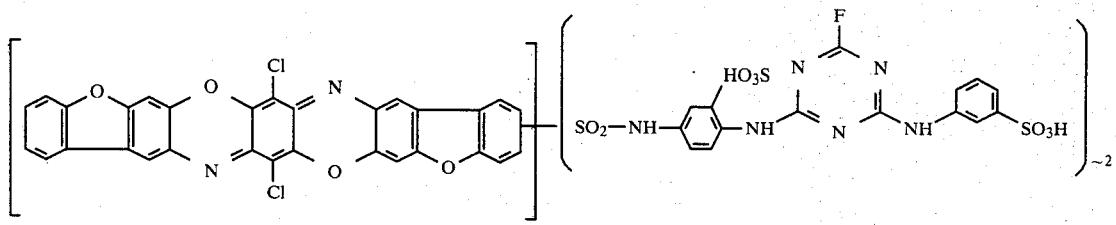

cellulose fibres can be dyed and printed in red-violet shades.

EXAMPLE 79

15.0 g of the dioxazine compound

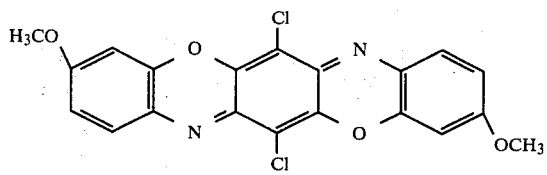

in 75 ml of chlorosulphonic acid are kept at 50°–55° for 10 hours. 21 ml of thionyl chloride are then added at 45° and the mixture is kept at this temperature for a further 2 hours. The batch is then discharged onto a mixture of 900 g of ice, 150 ml of water and 60 ml of concentrated hydrochloric acid. The precipitate is filtered off with suction and washed with water until sulphate-free.

The resulting filter cake of the bis-sulphochloride is added to a neutralised solution of 16.0 g of 2,5-diamino-benzenesulphonic acid in 300 ml of water and the pH value is maintained at 7.5 using a sodium carbonate solution. After 3 hours the reaction mixture is heated to 60°, kept at this temperature for 5 hours and 30 ml of pyridine are then added and the temperature is raised to 80°.

After the reaction is complete, the reaction product is isolated by salting out, filtered off with suction and dried. 24.0 g of the product obtained are dissolved in 750 ml of water. 5.1 ml of cyanuric fluoride are added dropwise at 0°–5° and the pH value is maintained at 5.0–5.5 using 2 N sodium carbonate solution. To complete the condensation reaction the mixture is stirred for 30 minutes at 0°–5° and subsequently a neutral solution of 12.0 g of 3-aminobenzenesulphonic acid in 150 ml of water is added at 0°–5° and the pH value is maintained at 6.0–6.2 using a sodium carbonate solution. After the reaction is complete, the mixture is heated to 20°, the pH being controlled, and the dyestuff is salted out with 20% of sodium chloride, filtered off with suction and washed with saturated sodium chloride solution.

The filter cake is made into a paste with phosphate buffer and is then dried in vacuo at 40°.

The dyestuff corresponds approximately to the formula

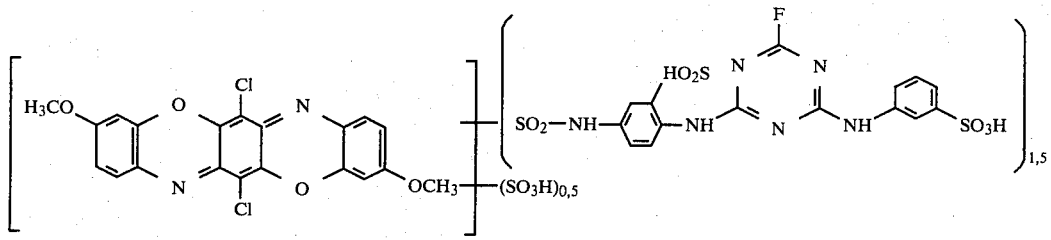

With it, cotton can be printed or dyed in red shades which are fast to wetting.

If the compounds which are listed in column II of Table 3, instead of the dyestuff intermediate products of Examples 74–79, are condensed with the reactive components of column III, dyestuffs are obtained using which cellulose materials can be dyed or printed by the techniques customary for reactive dyestuffs to give the shades indicated.

See Table 3 below.

TABLE 3

| I | II | III | IV |
|---|---|---|---|
| 80 | (dioxazine core with Cl substituents, N-C₂H₅ groups, bracketed {SO₂—NH—C₆H₃(SO₃H)(NHCH₃)}~1 and (SO₃H)~1) | 1. cyanuric chloride (2,4,6-trichloro-triazine); 2. 3-aminobenzenesulfonic acid (NH₂—C₆H₄—SO₃H) | reddish-tinged blue |
| 81 | (dioxazine core with Cl substituents, N-C₂H₅ groups, bracketed {SO₂—NH—C₆H₃(NH₂)(SO₃H)}~2) | 1. 2,4,6-trifluoro-triazine; 2. 5-amino-benzene-1,3-disulfonic acid | reddish-tinged blue |
| 82 | (dioxazine core with Cl substituents, N-C₂H₅ groups, bracketed {SO₂—NH—C₆H₄—NH₂}~1 and (SO₃H)~1) | 1. cyanuric chloride; 2. 4-methyl-2-amino-benzene-1,5-disulfonic acid (CH₃, NH₂, SO₃H, SO₃H) | reddish-tinged blue |
| 83 | (dioxazine core with Br substituents, N-C₂H₅ groups, bracketed {SO₂—NH—C₆H₃(SO₃H)(NH₂)}~2) | 1. 2,4,6-trifluoro-triazine; 2. 4-aminobenzenesulfonic acid (H₂N—C₆H₄—SO₃H) | reddish-tinged blue |

TABLE 3-continued

TABLE 3-continued

TABLE 3-continued

| I | II | III | IV |
|---|---|---|---|
| 94 | (dioxazine with naphthalene groups, Cl substituents, –SO₂–NH– linker to aminobenzene with SO₃H, ~1; (SO₃H)~1) | triazine with 2 Cl; SO₂–CH₂–CH₂–OSO₃H on aminobenzene | red |
| 95 | (dioxazine with phenanthrene groups, Cl substituents, –SO₂–NH– linker to N(CH₃)-phenyl, ~1; (SO₃H)~5) | 1. triazine with 2 Cl; 2. NH-phenyl-2,5-(SO₃H)₂ | greenish-tinged blue |
| 96 | (dioxazine with phenanthrene groups, Cl substituents, –SO₂–NH– linker to SO₃H-aminobenzene, ~1; (SO₃H)~2.5) | 1. triazine with 2 F; 2. NH₂-phenyl-SO₃H | greenish-tinged blue |
| 97 | (dioxazine with N-ethyl carbazole-type groups, CH₃ substituents, SO₃H, NH₂, –SO₂–NH– linker, ~1; (SO₃H)~1) | pyrimidine with 3 F and Cl | blue |

TABLE 3-continued

| I | II | III | IV |
|---|---|---|---|
| 98 | (dioxazine with CH3, Cl substituents; SO2-NH-aryl(SO3H)2-NH2 group, ~2) | 1. chlorotriazine (Cl, Cl); 2. 3-aminobenzenesulfonic acid (NH2, SO3H) | reddish-tinged blue |
| 99 | (dioxazine with OCH3 substituents; SO2-NH-aryl(CH3, NH2, SO3H), (SO3H)~1) | chloropyrimidine with OCH2—CH2—OCH3 | violet |
| 100 | (dioxazine with NHCOCH3, N-C2H5; SO2-NH-aryl(SO3H, NH2), ~2) | 1. fluorotriazine (F, F); 2. 4-methyl-3-aminobenzenesulfonic acid (NH2, SO3H, H3C) | blue |
| 101 | (dioxazine with Cl, OCH3; SO3-NH-aryl(SO3H, NH2), (SO3H)~1) | 1. chlorotriazine (Cl, Cl); 2. 3-aminobenzenesulfonic acid (H2N, SO3H) | red |

TABLE 3-continued

| I | II | III | IV |
|---|----|-----|----|
| 102 | (dimethoxy dichloro dioxazine with two SO₂—NH-[3-NH₂-4-SO₃H-phenyl] groups) | 1. cyanuric chloride (Cl, N, Cl, N, Cl) 2. NH₂—C₆H₄—SO₂CH₂CH₂OSO₃H | red |
| 103 | (dichloro dioxazine fused with pyrene, with (SO₂—NHCH₃)~1 and (SO₃H)~3) | 2,4-difluoro-5-chloropyrimidine | blue |
| 104 | (dichloro dioxazine with 4-chloroanilino and SO₃H substituents, with SO₂—NH—[2-NH₂-3-SO₃H-phenyl]~1.5 and (SO₃H)~0.5) | 1. cyanuric chloride 2. H₂N—C₆H₄—SO₃H | blue |
| 105 | (dichloro dioxazine with phenylamino and SO₃H substituents, with SO₂—NH—C₆H₄—NH₂~1 and (SO₃H)~1) | difluorotriazine with NH—C₆H₄—SO₃H | blue |

TABLE 3-continued

| I | II | III | IV |
|---|---|---|---|
| 106 | (dioxazine with CH3-phenoxy groups, Cl, sulfonamide-aniline-SO3H-NH2)~2, (SO3H)~1 | 1. triazine-F3; 2. m-aminobenzenesulfonic acid | red |
| 107 | (dioxazine with CH3-phenoxy groups, Cl, sulfonamide-aniline-SO3H-NH2)2 | 1. triazine-F3; 2. m-aminobenzenesulfonic acid | red |
| 108 | (dioxazine with N-C2H5, COOH, fused ring system)2 | 1. triazine-Cl3; 2. m-aminobenzenesulfonic acid | blue |

TABLE 3-continued

| I | II | | III | IV |
|---|---|---|---|---|
| 109 | bis-ethylamino/chloro triphenodioxazine with (SO₂—NH—C₆H₃(NH₂)(SO₃H))₂ substituent | | 1. cyanuric chloride (trichlorotriazine); 2. 3-aminobenzenesulfonic acid; 3. nicotinic acid (pyridine-3-COOH) | blue |
| 110 | bis-ethylamino/benzoylamino triphenodioxazine with ~1 SO₂—NH—C₆H₃(NH₂)(SO₃H) and ~1 (SO₃H) | | 1. trifluorotriazine; 2. 3-aminobenzenesulfonic acid | reddish-tinged blue |
| 111 | bis-methoxy/methylcarbamoyl triphenodioxazine with (SO₂—NH—C₆H₃(NH₂)(SO₃H))₂ | | 1. 2,4-dichloro-triazine; 2. 4-methoxy-3-aminobenzenesulfonic acid | red |
| 112 | bis-methoxy/chloro triphenodioxazine with ~1 SO₂—NH—C₆H₃(NH₂)(SO₃H) and ~1 (SO₃H) | | 1. difluorochlorotriazine; 2. 3-aminobenzenesulfonic acid | bluish-tinged red |

EXAMPLE 113

A. 18.2 g of the dioxazine compound of the formula

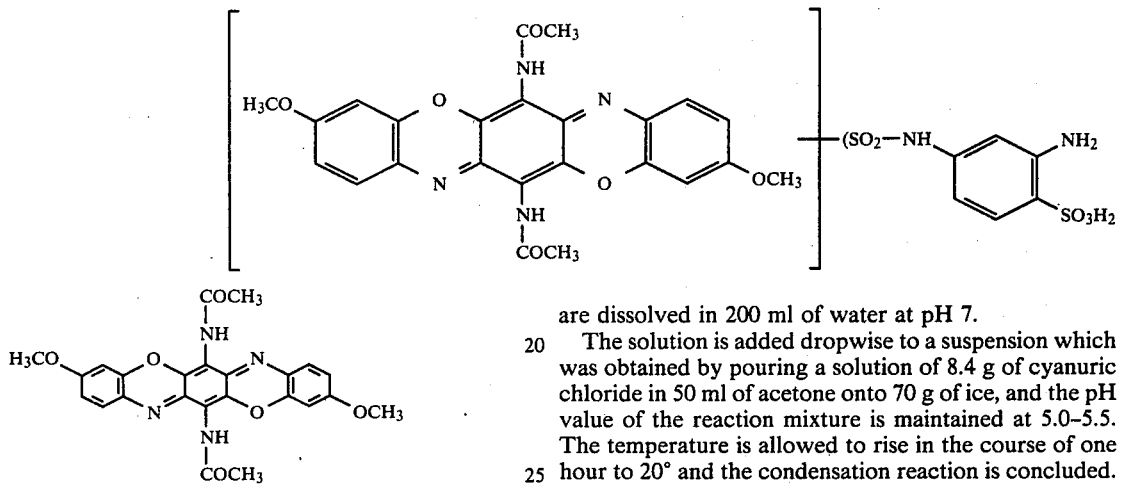

are added in the course of 2 hours to 52 ml of chlorosulphonic acid. The mixture is heated to 60°, after ½ an hour it is heated to 70° and is maintained at this temperature for 2 hours. 9 ml of thionyl chloride are subsequently added dropwise at 20° and the mixture is heated for 2 hours at 70°. The reaction mixture is cooled to 20°, discharged onto a mixture of 650 g of ice, 100 ml of water and 40 ml of concentrated hydrochloric acid, and the resulting suspension of the bis-sulphochloride is filtered off with suction. The filter cake is washed with ice-water.

The filter cake is added to a neutralised solution of 22.6 g of 2,4-diaminobenzenesulphonic acid in 300 ml of water, the pH value is kept at 7.5–8.0 using 2 N sodium carbonate solution and the mixture is then heated at 50° for 14 hours, the pH being further controlled, and thereafter for 3 hours at 70°. After the condensation reaction is complete, the pH value of the batch is adjusted to 4 using hydrochloric acid. 100 g of sodium chloride are gradually added, the mixture is stirred for one hour, the precipitated product is filtered off with suction, washed with 25% strength sodium chloride solution and dried at 60° in a circulating-air cabinet.

28.4 g of the intermediate product of the formula are dissolved in 200 ml of water at pH 7.

The solution is added dropwise to a suspension which was obtained by pouring a solution of 8.4 g of cyanuric chloride in 50 ml of acetone onto 70 g of ice, and the pH value of the reaction mixture is maintained at 5.0–5.5. The temperature is allowed to rise in the course of one hour to 20° and the condensation reaction is concluded. A neutral solution of 10.2 g of 3-aminobenzenesulphonic acid in 100 ml of water is subsequently added and the reaction mixture is heated to 40°. During the course of the above, the pH value is constantly maintained at 6.5–7. Stirring is continued for a few hours at 40° until the reaction is complete and the dyestuff is then salted out by gradually adding 75 g of sodium chloride. Stirring is continued, the precipitated dyestuff is filtered off with suction, washed with 15% strength sodium chloride solution and dried in vacuo at 50°.

With the dyestuff of the formula

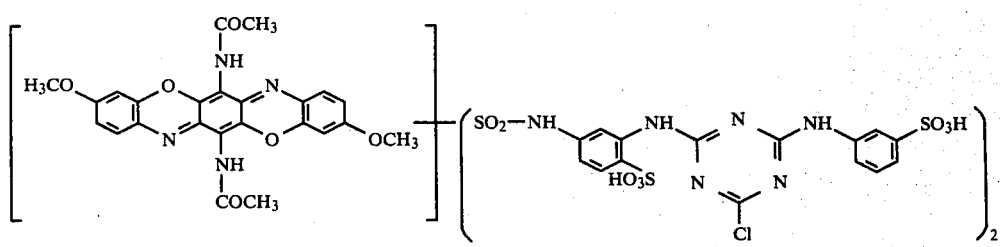

cellulose fibres can be dyed or printed in clear red shades having good fastness properties.

EXAMPLE 114

A. 16.0 g of the dioxazine intermediate product of the formula

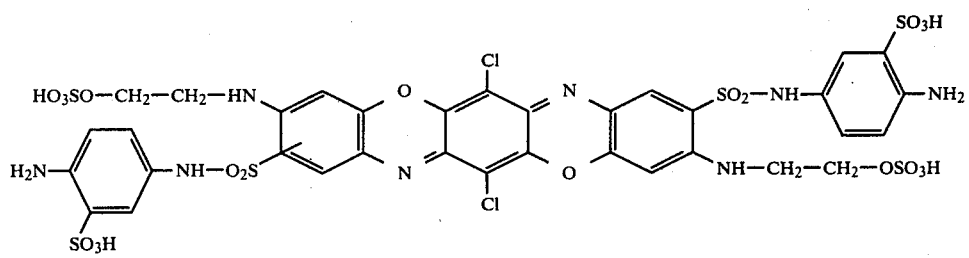

are dissolved in 360 ml of water by neutralising up to pH 6. 3.2 ml of cyanuric fluoride are added dropwise, within the course of 5 minutes at 0°–5°, to the solution and the pH value is maintained at 4.5–4.8 using 2 N sodium carbonate solution. The mixture is stirred for 30 minutes and a neutralised solution of 8.7 g of 3-aminobenzenesulphonic acid in 80 ml of water is then added. Now the pH value is kept at 6.0–6.2 using sodium carbonate solution and the temperature is further maintained at 0°–5°. After the condensation reaction is complete, the mixture is warmed to 20° and the dyestuff is salted out with 75 g of potassium chloride. The precipitate is filtered off with suction and washed with 25% strength potassium chloride solution, is made into a paste with phosphate buffer and is dried in vacuo at 50°. The dyestuff of the formula

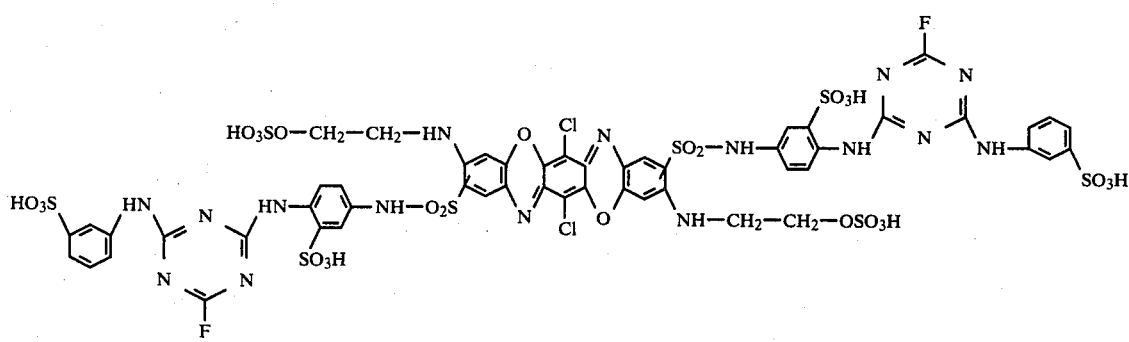

gives clear, blue dyeings and prints, on cellulose fibres, having good—very good wet-fastness properties.

B. The dioxazine intermediate product used in Example 114A is prepared as follows:

34.6 g of 5-amino-2-β-hydroxyethylamino-benzenesulphonic acid (4′-amino-3′-sulpho-phenylamide) are dissolved in 250 ml of water at pH 6. The solution is heated to 45°–50° and a suspension of 10.5 g of 2,3,5,6-tetrachlorobenzoquinone in 30 ml of ethanol is added to the solution. The pH value is maintained at 6.0–6.3 by the dropwise addition of 2 N sodium carbonate solution. After several hours the condensation reaction is complete. The resulting brown precipitate is filtered off with suction, washed with 5% strength sodium chloride solution and dried.

C. 31.0 g of the condensation product obtained in B are added at 15°–20° to 150 ml of 20% strength oleum. The mixture is stirred for a short period until everything has dissolved and 15.3 g of potassium peroxide disulphate (K$_2$S$_2$O$_8$) are added within the course of 20 minutes. During the addition the temperature is maintained at 20°–25° by intermittent slight cooling. After the ring closure is complete, the solution is added to 750 g of ice. The dioxazine intermediate product is salted out from the blue solution by adding 125 g of potassium chloride, the precipitation is completed by subsequent stirring for several hours, the precipitate is filtered off with suction and the filter cake is washed with 25% strength potassium chloride solution until sulphate-free. The filter cake is dried at 60° in a circulating-air cabinet.

EXAMPLE 115

If the cyanuric fluoride in Example 114 is replaced by 5.4 g of cyanuric chloride and the procedure followed is analogous otherwise, a blue dyestuff is obtained, which also yields, on cellulose fabric, prints and dyeings which are fast to wetting.

EXAMPLE 116

15.0 g of the dioxazine intermediate product of the formula

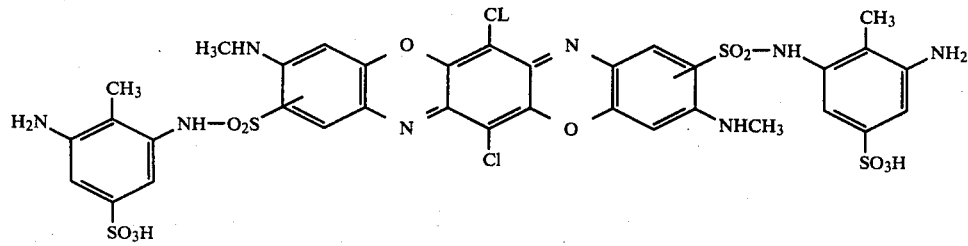

are dissolved in 200 ml of water by neutralising. A solution of the reactive component which was prepared by reacting 8.7 g of 3-aminobenzenesulphonic acid with 4.7 ml of cyanuric fluoride in the manner described in Example 1 is added dropwise to this solution at 0°–5° in the course of 30 minutes. The pH value of the reaction mixture is maintained at 5.8–6.0 using 2 N sodium carbonate solution and these conditions are maintained for several hours until the completion of the condensation reaction, which is determined chromatographically. The solution is then warmed to 20°. The resulting dyestuff is salted out with sodium chloride, filtered off with suction, the filter cake is washed with 10% strength sodium chloride solution and dried. The resulting dyestuff of the formula

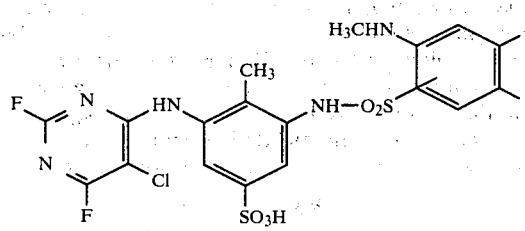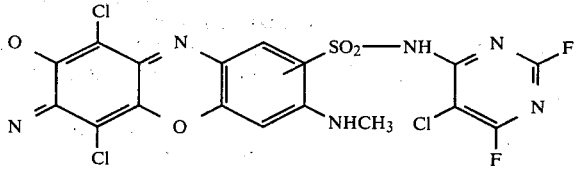

dyes cellulose fibres, for example at a long liquor ratio, in intense blue shades having good wet-fastness properties.

EXAMPLE 117

17.0 g of the dioxazine intermediate product of the formula (prepared analogously to Example 114B-C) are neutralised in 200 ml of water up to pH 6. This solution is added dropwise at 0°–5° to a suspension which was prepared by dissolving 5.5 g of cyanuric chloride in 25 ml of acetone and pouring the solution onto 70 ml of ice-water. During the addition the pH value is maintained at 4.5–5 using 2 N sodium carbonate solution. 5.2 g of 3-aminobenzenesulphonic acid are added to the clarified solution obtained after completion of the reaction. The pH value is now maintained at 6.0–6.4 and the reaction mixture is warmed to 25°–30°. After the reaction is complete, the dyestuff is salted out with sodium chloride, filtered off with suction, washed with 25% strength sodium chloride solution and dried. It corresponds to the formula

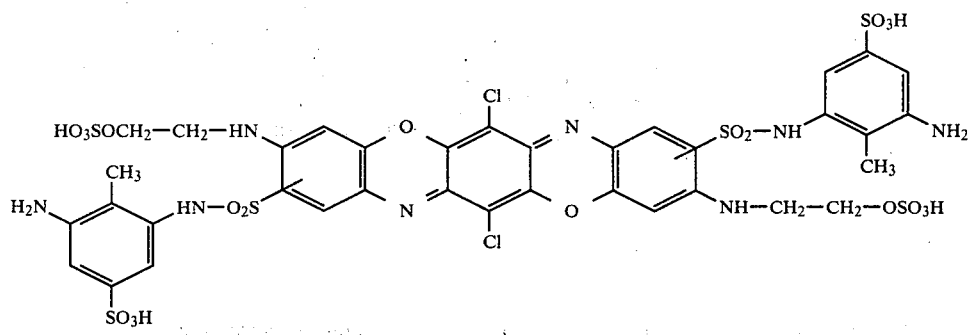

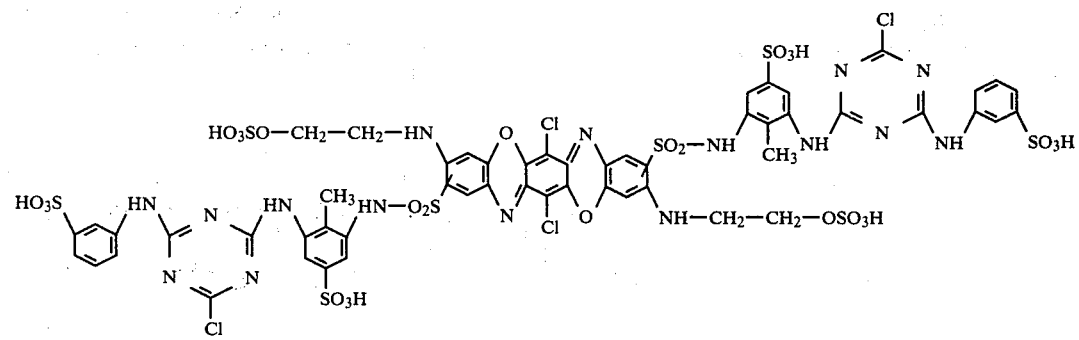

and gives, on cellulose fibres, clear blue prints and dyeings having good wet-fastness properties.

If the dioxazine components listed in the second column of Table 4 are reacted with the reactive components of column 3, further reactive dyestuffs are obtained, which yield, on cellulose fibres, clear blue dyeings and prints which are fast to wetting.

TABLE 4

| Example No. | Dioxazine component | Reactive component |
|---|---|---|
| 119 | Dioxazine with SO₃H, NH₂, CH₃ substituents; SO₂–NH linkage to aniline with NH–CH₂–CH₂–OSO₃H; dichlorobenzodioxazine core; symmetric structure with HO₃SO–CH₂–CH₂–HN, CH₃, H₂N, SO₃H | Cl–CO–benzene with two C(Cl)=N groups |
| 120 | Dioxazine with SO₃H, NH₂ substituents; SO₂–NH linkage with NHCH₃; dichlorobenzodioxazine core; symmetric with H₃CHN, H₂N, SO₃H | (1.) Cyanuric chloride (trichlorotriazine)<br>(2.) 3-amino-benzenesulfonic acid (SO₃H, NH₂) |
| 121 | Dioxazine with SO₃H, NH₂ substituents; SO₂–NH linkage with NHC₂H₅; dichlorobenzodioxazine core; symmetric with H₅C₂HN, H₂N, HO₃S | (1.) Trifluorotriazine<br>(2.) 3-amino-benzenesulfonic acid (SO₃H, NH₂) |

TABLE 4-continued
| Example No. | Dioxazine component | Reactive component |
|---|---|---|
| 122 | 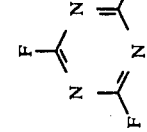 | 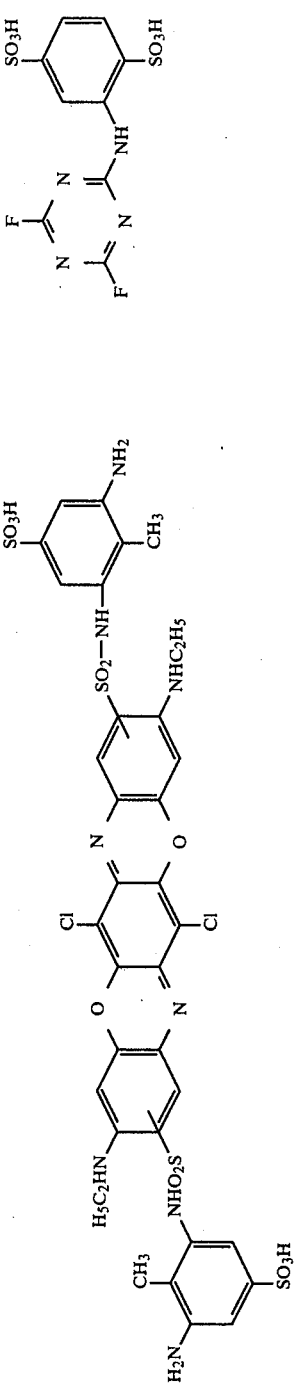 |
| 123 | 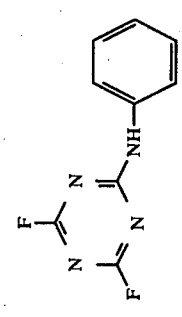 | 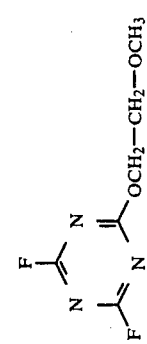 |
| 124 | " | 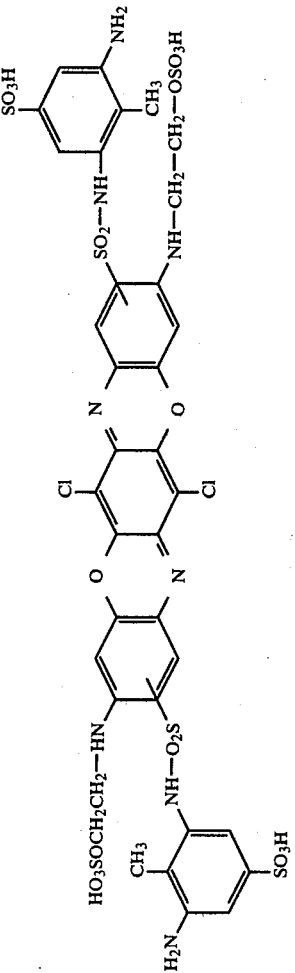 |
| 125 | " | 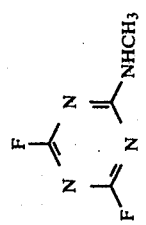 |

TABLE 4-continued
| Example No. | Dioxazine component | Reactive component |
|---|---|---|
| 126 | | 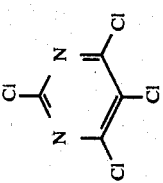 |
| 127 | " | 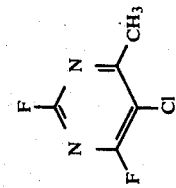 |
| 128 | 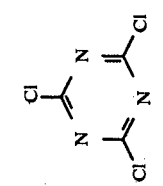 | 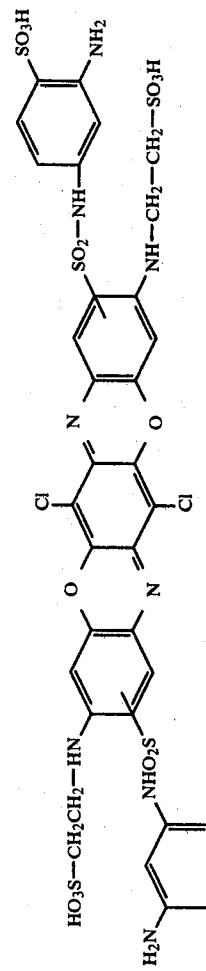 |
| 129 | 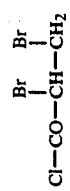 | 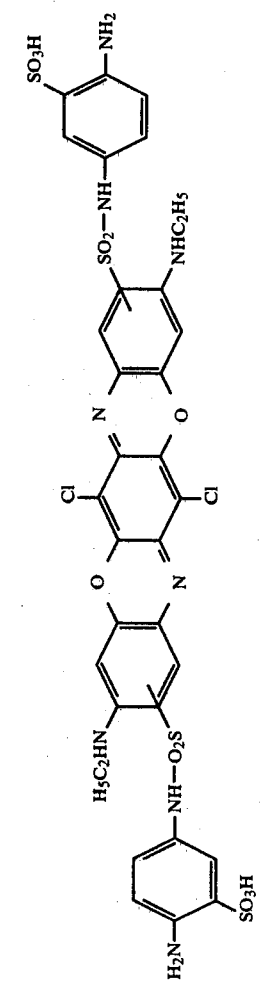 |

TABLE 4-continued

| Example No. | Dioxazine component | Reactive component |
|---|---|---|
| 130 | (structure) | (structure) |
| 131 | (structure) | (structure) |
| 132 | (structure) | (1.) (structure) (2.) (structure) |
| 133 | (structure) | |

TABLE 4-continued

| Example No. | Dioxazine component | Reactive component |
|---|---|---|
| 134 | | 2-NH-(cyanuric dichloride) substituted benzene-1,4-disulfonic acid (3-NH linkage, SO₃H at positions 2 and 5) |
| 135 | " | 5-chloro-6-methyl-2-methylsulfonyl-4-chloropyrimidine |
| 136 | Dioxazine with SO₂—NH bridges: 4-amino-2-COOH-phenyl—SO₂NH— and —NH—CH₂—CH₂—SO₃H substituents on dioxazine ring system (symmetric, with Cl substituents) | 2,4-difluoro-6-N(CH₃)₂-triazine |
| 137 | Dioxazine with SO₂NH—(4-aminophenyl) and —NH—CH₂—CH₂—OSO₃H substituents on symmetric dioxazine ring system (with Cl substituents) | 2-NH-(cyanuric dichloride) benzene-2,4-disulfonic acid |

TABLE 4-continued

| Example No. | Dioxazine component | Reactive component |
|---|---|---|
| 138 | (complex dioxazine with two aminotoluenesulfonic acid groups linked via SO₂-NH bridges) | difluoro-dichloropyrimidine |
| 139 | " | 2-(phenyl-NH)-4,6-difluoro-1,3,5-triazine with o-SO₃H |
| 140 | " | 2-(phenyl-NH)-4,6-difluoro-1,3,5-triazine with p-SO₃H |
| 141 | " | 2-(phenyl-NH)-4,6-difluoro-1,3,5-triazine with 2,5-di-SO₃H |
| 142 | (dioxazine with –SO₂–NH–CH₂–CH₂–NH₂ and –NH–CH₂–CH₂–OSO₃H groups) | 2-(phenyl-NH)-4,6-difluoro-1,3,5-triazine with o-SO₃H |

TABLE 4-continued

TABLE 4-continued
| Example No. | Dioxazine component | Reactive component |
|---|---|---|
| 147 | 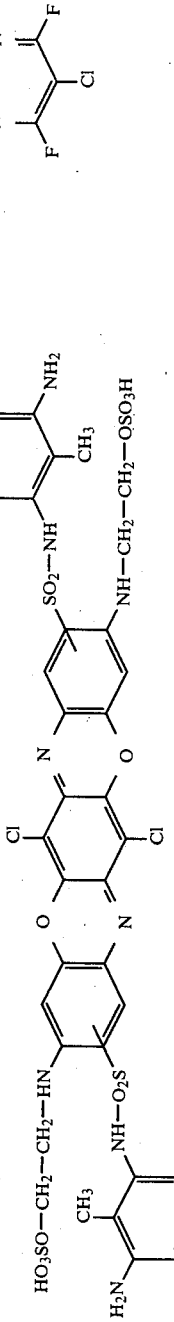 | 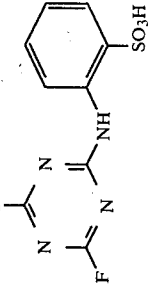 |
| 148 | 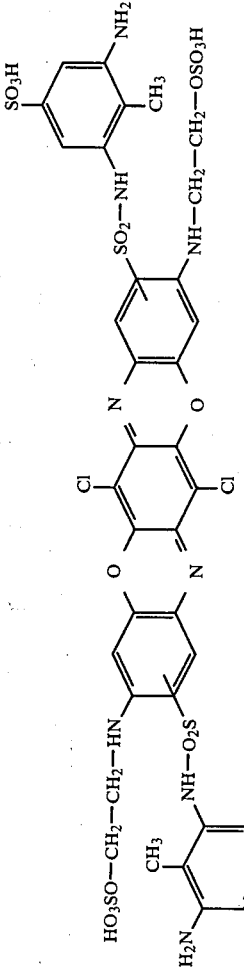 | 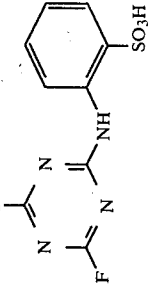 |
| 149 | 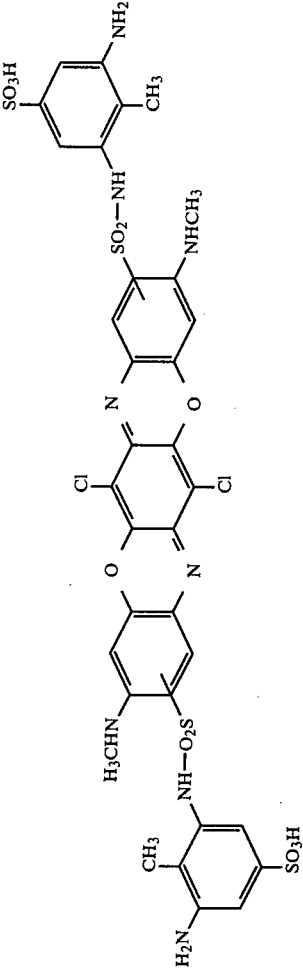 | 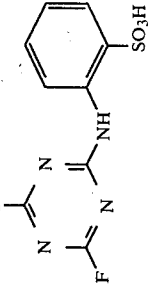 |

TABLE 4-continued
| Example No. | Dioxazine component | Reactive component |
|---|---|---|
| 150 | 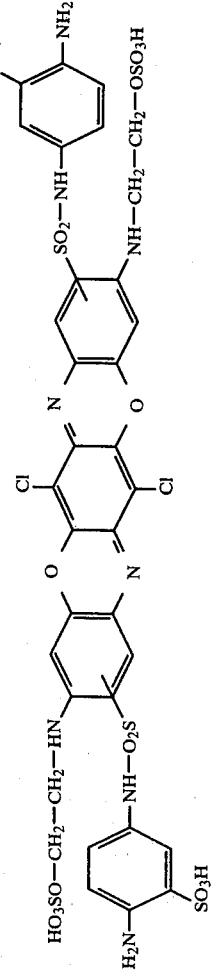 | 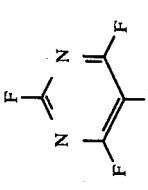 |

We claim:
1. A compound of the formula

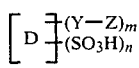

wherein
D denotes a (m+n)-valent radical derived from a dioxazine system of the formula

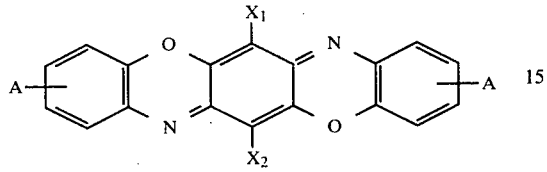

wherein
A stands for NH$_2$;

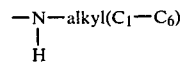

unsubstituted or substituted by SO$_3$H, OSO$_3$H, OH, O-alkyl(C$_1$–C$_4$); NH-cyclohexyl; NH-aryl unsubstituted or substituted by halogen, alkyl(C$_1$–C$_4$), O-alkyl(C$_1$–C$_4$), NH-acetyl, SO$_3$H; O-alkyl(C$_1$–C$_4$); O-aryl unsubstituted or substituted by alkyl(C$_1$–C$_4$) or halogen
and wherein
X$_1$ and X$_2$ independently of one another denote hydrogen, optionally substituted C$_1$–C$_4$-alkyl, cycloalkyl, optionally substituted aryl, CN, halogen, COOR$_1$ (wherein R$_1$ denotes H, alkyl or cycloalkyl) or CONR$_2$R$_3$ (wherein R$_2$ and R$_3$ independently of one another are H, optionally substituted C$_1$–C$_4$-alkyl, cycloalkyl or optionally substituted aryl), said optional substituents being OH, SO$_3$H, COOH or halogen, or wherein
D denotes a (m+n)-valent radical derived from a dioxazine system of the formula

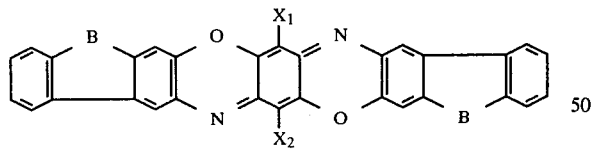

wherein
B stands for NH, NH-alkyl (C$_1$–C$_2$), O or CH$_2$ and wherein
X$_1$ and X$_2$ have the meanings given above or wherein
D denotes a (m+n)-valent radical derived from a dioxazine system of the formulae

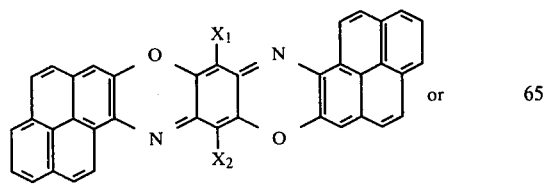

or

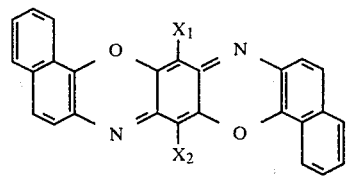

wherein X$_1$ and X$_2$ have the meanings given above and wherein
Y denotes a bridge member of the formulae

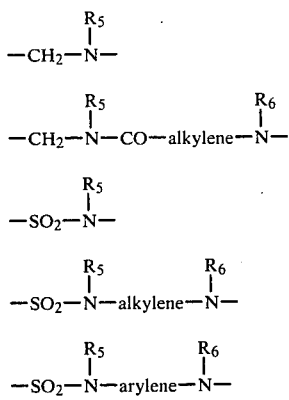

wherein
R$_5$ denotes H or C$_1$–C$_4$-alkyl which may be substituted by OH, SO$_3$H or OSO$_3$H,
R$_6$ denotes H or C$_1$–C$_4$-alkyl which may be substituted by OH, SO$_3$H or OSO$_3$H,
alkylene denotes alkylene radicals or cycloalkylene radicals having 1 to 6 carbon atoms, which may be interrupted by O or S and which may be substituted by OH, SO$_3$H or OSO$_3$H, and arylene denotes 1,2-, 1,3- or 1,4-phenylene radicals which may be substitutd by C$_1$–C$_4$-alkyl, halogen, SO$_3$H, COOH or C$_1$–C$_4$-alkoxy
wherein
m denotes 1 or 2 and
n denotes 0 to 4
and wherein
Z denotes a radical selected from 2,4-dichloro-s-triazinyl, 2,4-dibromo-s-triazinyl, 2-fluoro-4-amino-s-triazinyl, 2-chloro-4-amino-s-triazinyl, 2-bromo-4-amino-s-triazinyl, 2-carboxy-pyridinuim-4-amino-s-triazinyl, 2-fluoro-4-(C$_1$–C$_4$)alkylamino-s-triazinyl, 2-chloro-4-(C$_1$–C$_4$)alkylamino-s-triazinyl, 2-2-bromo-4-(C$_1$–C$_4$)alkylamino-s-triazinyl, 2-fluoro-4-di-(C$_1$–C$_4$)alkylamino-s-triazinyl, 2-chloro-4-di-(C$_1$–C$_4$)alkylamino-s-triazinyl, 2-bromo-4-di-(C$_1$–C$_4$)alkylamino-s-triazinyl, unsubstituted 2-fluoro-, 2-chloro-, 2-bromo-4-arylamino-5-triazinyl, 2-fluoro-, 2-chloro-, 2-bromo-4-arylamino-s-triazinyl substituted by SO$_3$H, COOH, SO$_2$—CH$_2$—CH$_2$—OSO$_3$H, 2-fluoro-, 2-chloro-, 2-bromo-4-(C$_1$–C$_4$)alkoxy-s-triazinyl, 2-fluoro, 2-chloro-2-bromo-4-aryloxy-s-triazinyl, 2,4,5-trifluoropyrimidyl, 2,4,5-trichloro-pyrimidyl, 2,4-difluoro-5-chloropyrimidyl, 2-fluoro-4-methyl-5-chloropyrimidyl, 2-methyl-sulphonyl-4-methyl-5-chloropyrimidyl, 2-fluoro-4,5-dichloropyrimidyl, 2,3-dichloroquinoxalin-6-carbonyl, 2,3- dichloroquinoxalin-6-sulphonyl, 2,3-dibromopropionyl, 2-bromo-acryloyl, 1,4-dichlorophthalazin-6-carbonyl, 1,4-dibromophthalazin-6-carbonyl, and 4,5-dichloro-6-pyridazon-1-phenylcarbonyl.

2. A compound of the formula

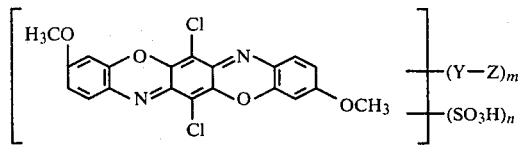

wherein
Y, Z, m and n have the meaning indicated in claim 1.

3. A compound of the formula

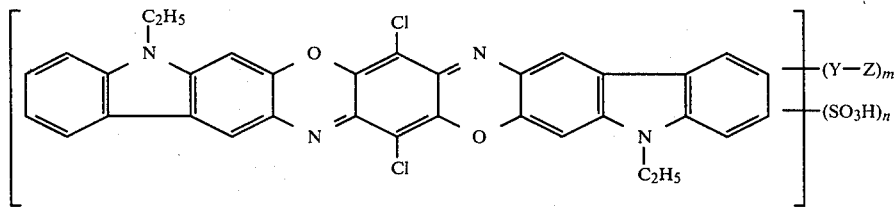

wherein
Y, Z, m and n have the meaning indicated in claim 1.

4. A compound of the formula

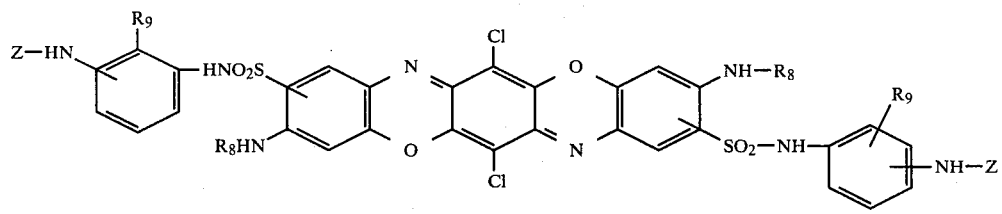

wherein
$R_8$ denotes $C_1-C_6$-alkyl which may be substituted by $OSO_3H$ or $SO_3H$,
$R_9$ denotes H, $CH_3$, $SO_3H$ or COOH and Z has the meaning indicated.

5. A compound according to the formula of claim 2, wherein
Y denotes —$CH_2$—NH—,

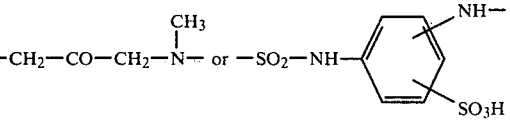

m denotes 1 or 2 and
n denotes 0 to 2.

6. A compound according to the formula of claim 3, wherein
Y denotes —$CH_2$—NH—,

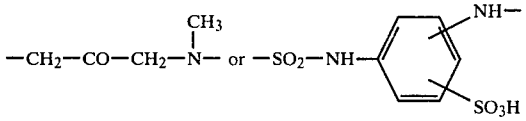

m denotes 1 or 2 and
n denotes 0 to 2.

* * * * *

UNITED STATES PATENT AND TRADEMARK OFFICE
CERTIFICATE OF CORRECTION

PATENT NO. : 4,400,504    Page 1 of 3
DATED    : August 23, 1983
INVENTOR(S) : Wolfgang Harms et al It is certified that error appears in the above-identified patent and that said Letters Patent is hereby corrected as shown below:

Col. 11, line 67         Delete "food" and insert --good--
Col. 22, lines 28-29     Delete "precedure" and insert --procedure--
Col. 22, line 61         Delete " 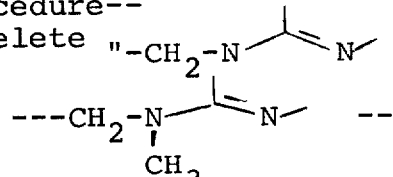 " and insert

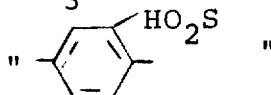 --

Col. 38, line 35         Delete 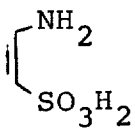 "

and insert -- 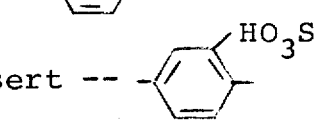 --

Col. 56, line 15         Delete " 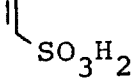 " and insert

-- 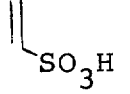 --

Col. 60, line 1          Delete formula after " 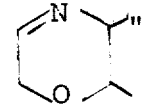 "

and insert

UNITED STATES PATENT AND TRADEMARK OFFICE
CERTIFICATE OF CORRECTION

PATENT NO. : 4,400,504  Page 2 of 3
DATED : August 23, 1983
INVENTOR(S) : Wolfgang Harms et al It is certified that error appears in the above-identified patent and that said Letters Patent is hereby corrected as shown below:

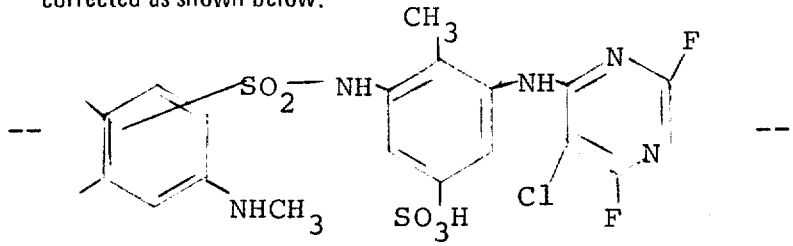

Col. 62          Beginning of formula No. 121
                 delete
                     "H$_2$S$_2$HN—"

and insert   --H$_5$C$_2$HN—--

Col. 72          Delete
                     "HO$_3$SO-CH$_2$-CH$_2$-HN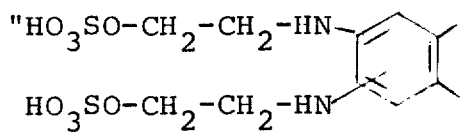"

and insert

UNITED STATES PATENT AND TRADEMARK OFFICE
CERTIFICATE OF CORRECTION

PATENT NO. : 4,400,504

DATED : August 23, 1983

INVENTOR(S) : Wolfgang Harms et al

It is certified that error appears in the above-identified patent and that said Letters Patent is hereby corrected as shown below:

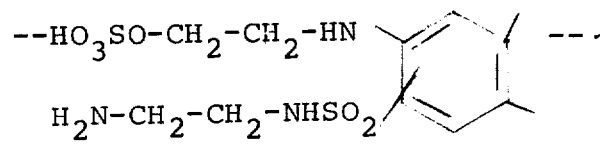

Signed and Sealed this

Seventeenth Day of January 1984

[SEAL]

Attest:

GERALD J. MOSSINGHOFF

Attesting Officer     Commissioner of Patents and Trademarks